(12) United States Patent  (10) Patent No.: US 11,175,371 B2
Alshaibani  (45) Date of Patent: Nov. 16, 2021

(54) ROTATABLE SHADOWBAND

(71) Applicant: Imam Abdulrahman Bin Faisal University, Dammam (SA)

(72) Inventor: Khalid Asker Alshaibani, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 79 days.

(21) Appl. No.: 16/600,928

(22) Filed: Oct. 14, 2019

(65) Prior Publication Data

US 2021/0109186 A1    Apr. 15, 2021

(51) Int. Cl.
*G01S 3/786* (2006.01)
*G01W 1/10* (2006.01)
(Continued)

(52) U.S. Cl.
CPC .............. *G01S 3/7861* (2013.01); *G01J 1/06* (2013.01); *G01W 1/10* (2013.01); *G01J 2001/4285* (2013.01)

(58) Field of Classification Search
CPC ......... G01S 3/7861; G01W 1/10; G01W 1/12; G01J 1/06; G01J 2001/4285; G01J 1/0271; G01J 1/0403; G01J 1/0437; G01J 1/42
See application file for complete search history.

(56) References Cited

U.S. PATENT DOCUMENTS 6,849,842 B2    2/2005  Little
8,481,905 B2 *  7/2013  Dolce ................... G01S 3/7861
                                            250/203.4
(Continued)

FOREIGN PATENT DOCUMENTS

CN    201434725 Y    3/2010
CN    201885797 U    6/2011
(Continued)

OTHER PUBLICATIONS

"User Manual SHR02, Shadow ring for pyranometers—combined with a pyranometer forming a diffusometer", Hukseflux Thermal Sensors, Version 1801, 2018, 46 pages.
"User Manual LP02, Second class pyranometer", Hukseflux Thermal Sensors, Version 1606, 2016, 46 pages.
Wilko Jessen, et al., "Calibration methods for rotating shadowband irradiometers and optimizing the calibration duration", Atmospheric Measurement Techniques, vol. 9, 2016, pp. 1601-1612.
(Continued)

*Primary Examiner* — Seung C Sohn
(74) *Attorney, Agent, or Firm* — Oblon, McClelland, Maier & Neustadt, L.L.P.

(57) ABSTRACT

A rotating shadowband for shading a pyranometer includes a cylindrical ring and a semicircular shadowband held within the cylindrical ring, a motor configured for rotating the shadowband, at least one solar panel, a rechargeable battery, and a controller having circuitry configured to power the first motor to rotate the semicircular shadowband. The semicircular shadowband may include a window opening, wherein the window opening substantially extends from a center of the band to a first end. The controller rotates the shadowband 0 to 360 degrees about the central axis of the cylindrical ring to alternately shade the pyranometer for making diffuse radiation measurements and expose the pyranometer to direct solar radiation for making global radiation measurements. Alternatively, the shadowband may be solid and rotate pivotally 0 to 180 degrees or 0 to 360 degrees within the cylindrical ring to alternately shade and expose a pyranometer head to and from direct sunlight respectively.

20 Claims, 25 Drawing Sheets

(51) Int. Cl.
    *G01J 1/06*    (2006.01)
    *G01J 1/42*    (2006.01)

(56)    References Cited

U.S. PATENT DOCUMENTS

| | | | |
|---|---|---|---|
| 8,981,272 B2 * | 3/2015 | Armstrong | ............ G01J 1/0462 |
| | | | 250/203.4 |
| 9,500,516 B2 | 11/2016 | Armstrong et al. | |
| 2014/0034805 A1 | 2/2014 | Dolce | |
| 2015/0031418 A1 | 1/2015 | Bovis | |

FOREIGN PATENT DOCUMENTS

| | | |
|---|---|---|
| CN | 203455074 U | 2/2014 |
| JP | 11-83622 A | 3/1999 |
| SU | 1578503 A1 | 7/1990 |

OTHER PUBLICATIONS

Michael John Brooks, "Application of a perforated shadow band to the decomposition of global solar irradiance", Dissertation in the Faculty of Engineering at Stellenbosch University, https://scholar.sun.ac.za/handle/10019.1/97959, Dec. 2015, 220 pages.

* cited by examiner

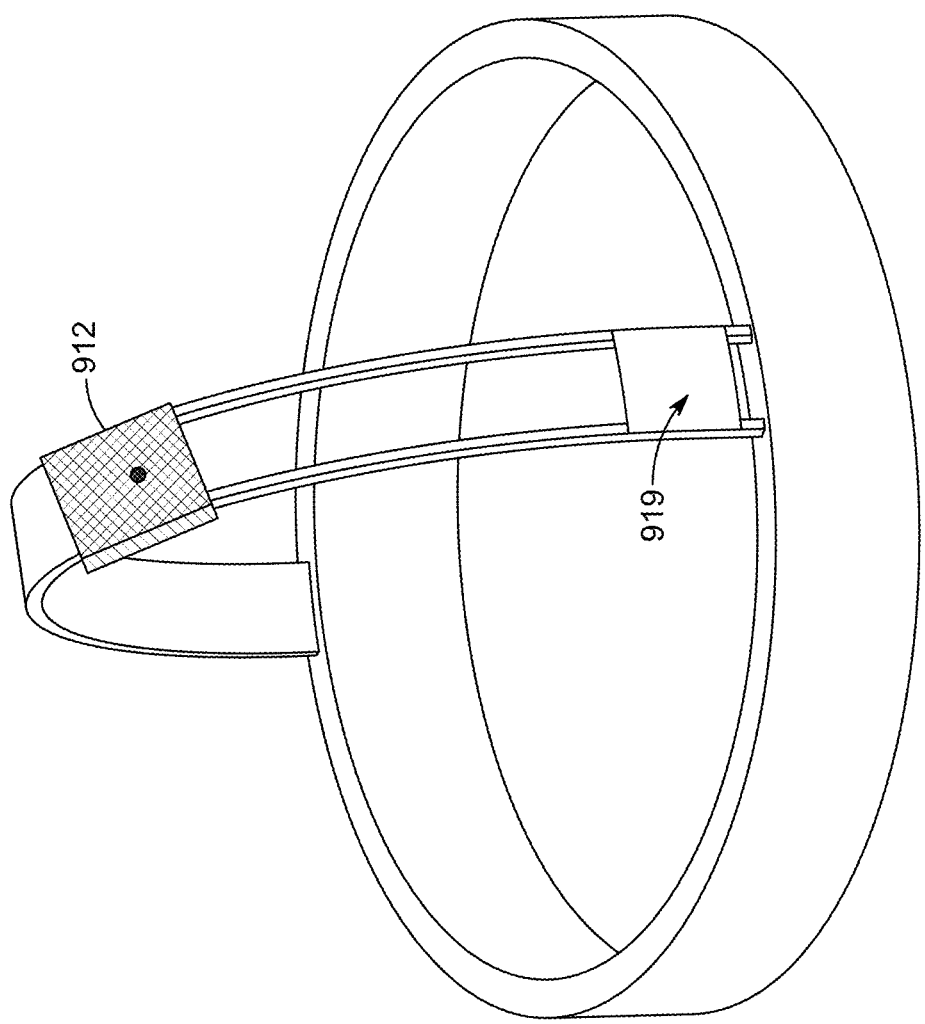

ROTATABLE SHADOWBAND

BACKGROUND

Technical Field

The present disclosure is directed to a rotatable shadowband for shielding a pyranometer head or a lighting sensor from direct solar radiation during diffuse radiation measurements.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The sun's radiation on the earth is referred to as global solar radiation. Sometimes called short-wave radiation, when measured global solar radiation is a combination of direct and diffuse solar radiation received from the hemisphere above the plane of a measuring instrument. Direct radiation is the radiation that comes directly from the sun, and diffuse radiation is the radiation that is scattered from the molecules or particulates in the atmosphere before reaching the earth as depicted by FIG. 1.

The sun outputs radiation over wavelengths from 0.15 to 4.0 µm, which is called the solar spectrum. The solar radiation spectrum that reaches earth's surface extends its wavelength approximately from 0.3 µm to 2.8 µm. Depending on the type of measuring instrument used, diffuse radiance measurements with different degrees of spectral sensitivity are obtained.

The measurement of global solar radiation is accomplished by using a pyranometer, as illustrated in FIG. 2. A pyranometer is a type of actinometer used for measuring solar irradiance on a planar surface and it is designed to measure the solar radiation flux density (W/m2) from the hemisphere above within a wavelength range 0.3 µm to 3 µm. Actinometers are instruments used to measure the heating power of radiation.

An actinometer is a chemical system or physical device which determines the number of photons in a beam integrally or per unit time. This name is commonly applied to devices used in the ultraviolet and visible wavelength ranges. For example, solutions of iron(III) oxalate can be used as a chemical actinometer, while bolometers, thermopiles, and photodiodes are physical devices giving a reading that can be correlated to the number of photons detected.

To make a measurement of irradiance, it is required by definition that the response to the "beam" of radiation varies with the cosine of the angle of incidence. This ensures a full response when the solar radiation hits the sensor perpendicularly (normal to the surface, sun at zenith, 0° angle of incidence), with zero response when the sun is at the horizon (90° angle of incidence, 90° zenith angle), and 0.5 at a 60° angle of incidence. It follows that a pyranometer should have a so-called "directional response" or "cosine response" that is as close as possible to the ideal cosine characteristic.

Global solar radiation measurements are used in many fields, for example: measuring solar energy in order to determine how efficiently solar panels are converting the sun's energy into electricity and when the panels need to be cleaned. Sensors used for this purpose usually measure radiation in the plane of the solar panel array. In further examples, global solar radiation measurements are used by utilities to predict gas and electricity energy usage, by research as one parameter to predict or quantify plant growth or production, by agriculture and by golf and park maintenance, in order to predict plant water usage and to schedule irrigation, and in meteorology as a factor in weather prediction models.

In order to measure diffuse solar radiation, direct solar radiation must be blocked to avoid mis-measurement of direct solar radiation as a component of diffuse solar radiation.

Several tools for measuring diffuse solar radiation have been proposed based on the concept of protecting the pyranometer, or one or more components of the pyranometer, form direct sun radiation. A commonly used tool for measuring the diffuse sky radiation is the shadow ring depicted in FIG. 3. (See CN201434725Y, incorporated herein by reference in its entirety). It is composed of a ring, or band, arranged to cast a shadow over the detector, which in turn collects only the diffuse component of solar radiation. The major advantage of the shadow-ring is that it is simple to operate and provides a direct estimate of the solar radiation diffuse component. The major disadvantage is the systematic underestimation of diffuse solar radiation as a result of the blocking effect caused by the ring. This effect is difficult to take into consideration because it depends not only on the geometrical characteristic of the device, but also on the hemispherical distribution of solar radiation. The combination of these two factors makes the measurements of diffuse solar radiation an observational challenge.

The rotating shadow band shown in FIG. 4, and in cross-section in FIG. 5, is another tool that can be used for measuring diffuse radiation and can also measure global solar radiation. The shadow band includes an arm (shadow band), and a mount which tilts the shadow band for latitude adjustment. The shadow band is connected to pyranometer. During a measurement of solar radiation, the shadow band rotates and hence shields the pyranometer head from direct radiation as it passes over the detector of the pyranometer, which allows the alternate measurement of direct and diffuse radiation. When the shadowband is in its resting position, the global horizontal irradiance (GHI) is measured. Diffuse horizontal irradiance (DHI) is measured during the rotation and direct normal irradiance (DNI) is calculated using GHI, DHI and the solar zenith angle. The rotation occurs with a constant angular velocity and takes approximately 1 to 2 seconds. During the rotation, the irradiance is measured at a high and constant sampling rate (e.g. 1 kHz). This measurement is analyzed in order to derive GHI and DHI for the time of the rotation. (See Jessen et al., "Calibration methods for rotating shadowband irradiometers and optimizing the calibration duration", Atmos. Meas. Tech., 9, 1601-1612, 2016; and Freeman et al., US20180031418, both incorporated herein by reference in their entirety)

Another tool for diffuse measurements is the "tracking solar disk" shown in FIG. 6 (See CN201885797U, incorporated herein by reference in its entirety). In this system, direct radiation is always blocked from reaching the pyranometer due to continuous movement by a tracking system, similar to an MPPT tracker. The system includes a multi-lobed shadow ring that allows the measurement of diffuse irradiance by several tilted pyranometers—from 60 to 90 degrees from the horizontal plane—and at different azimuthal angles which allows detection in the four cardinal directions. The ring is designed to minimize the covered celestial dome observed by each sensor. Moreover, the complete device requires a small installation area and is inexpensive and easy to operate. The measurements have to be corrected with a geometrical correction factor that takes into account the portion of the sky blocked by the shadow-ring.

The diffuse radiation measuring devices above lack ruggedness in the field and may require mathematical correction for the solar irradiance volume blocked by the shadow ring. A device for shading a pyranometer head (e.g., solar radiation detector) for global and diffuse radiation measurements is needed which is robust, simple to adjust, and does not have a shadow ring or other equipment which interferes with the accuracy of the measurements.

SUMMARY

In an exemplary embodiment a rotating shadowband for shading a pyranometer is described, comprising a support structure including a base, a top surface, a hollow interior and side walls, a first cylindrical ring connected to the top surface, a semicircular shadowband held by the cylindrical ring, a motor configured for rotating the shadowband by a motor shaft, a rechargeable battery, and a controller having circuitry configured to power the first motor to rotate the semicircular shadowband.

In an embodiment, the semicircular shadowband may include a window opening, wherein the window opening substantially extends from a center of the band to a first end. A sliding cover may be attached to the shadowband, wherein the sliding cover is configured to slide over the window opening to shade the pyranometer. The semicircular shadowband may be rotated about the central axis of a cylindrical ring to alternately shade and expose a pyranometer from or to direct sunlight respectively.

In another embodiment, the semicircular shadowband may be solid, without a window opening. The semicircular shadowband may be rotated pivotally within a cylindrical ring to alternately shade and expose a pyranometer from or to direct sunlight respectively. In this embodiment, the shadowband rotates between an orientation where the band is flush with the cylindrical ring and a second orientation where the shadowband is perpendicular to the cylindrical ring.

A motor is configured to operate the movement of the shadowband using power from a grid or from solar panels attached to the support structure. A controller within the support structure may receive measurements from a pyranometer and adjust the rotation of the shadowband based on the measurements.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 9B shows a three dimensional view of the shadowband and ring from above;

DETAILED DESCRIPTION

Figure 1:
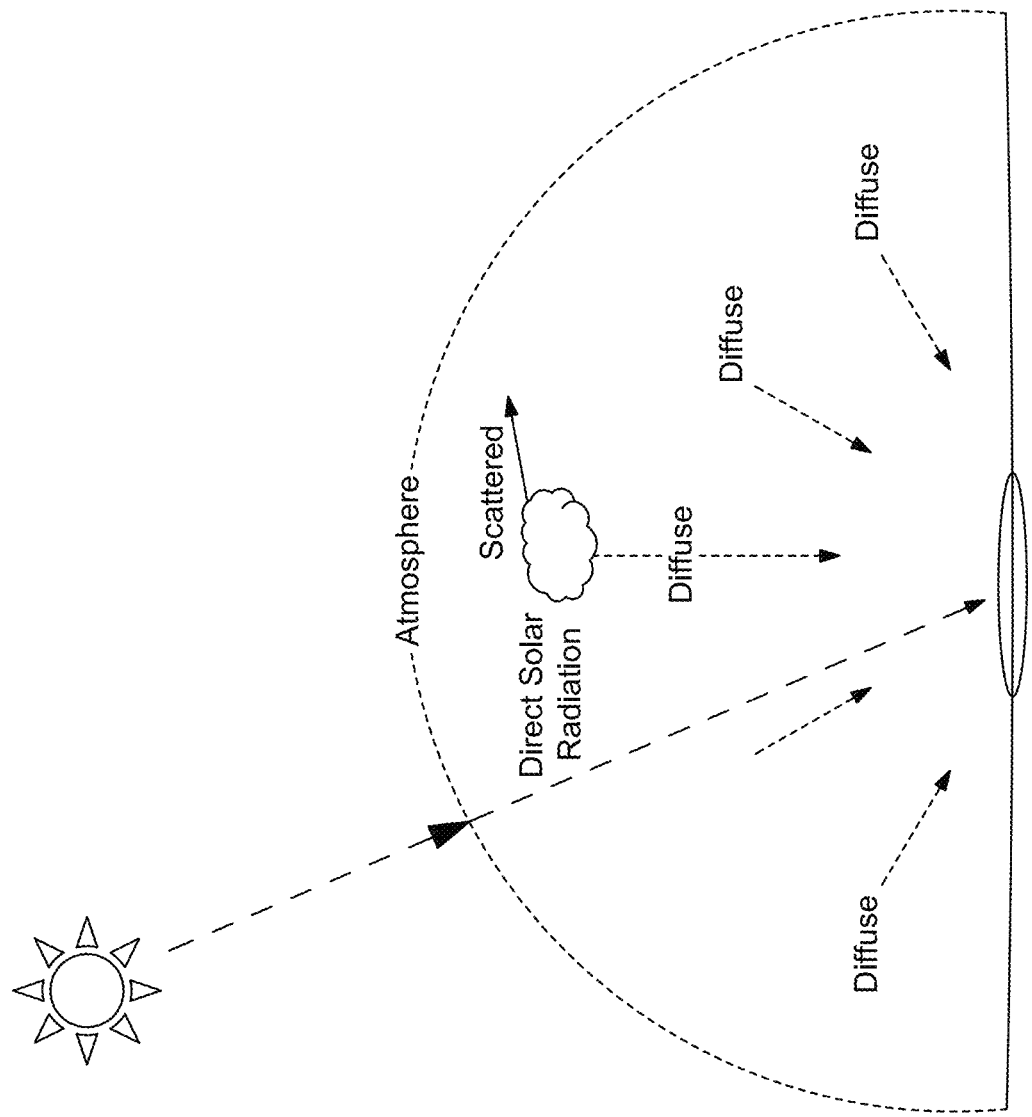
FIG. 1 illustrates direct and diffuse solar radiation.
Figure 2:
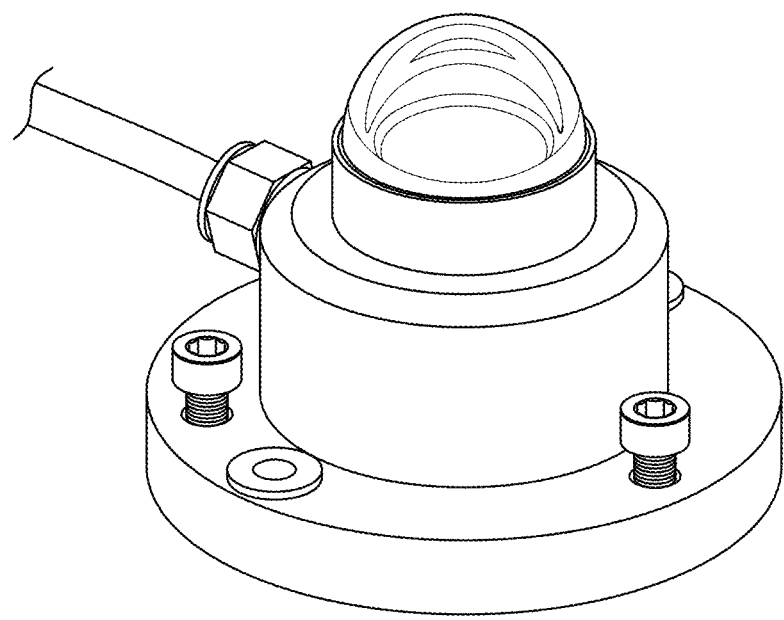
FIG. 2 is an illustration of a pyranometer that is used to measure solar irradiance.
Figure 3:
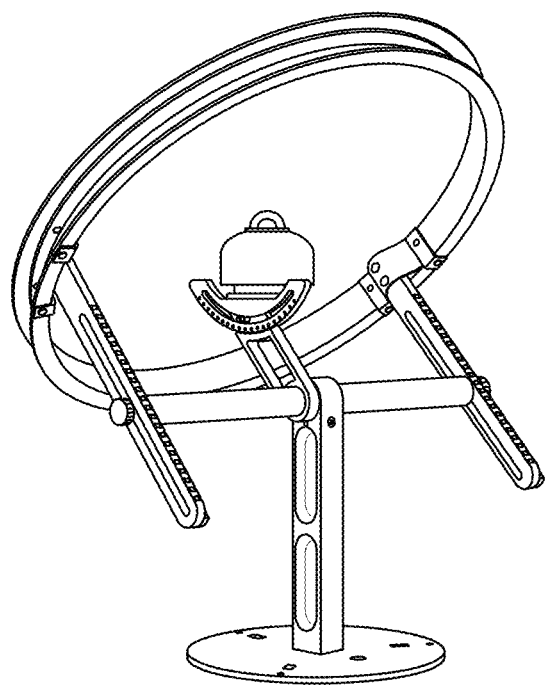
FIG. 3 an illustration of an example of a shadow ring where the pyranometer is protected from direct sun radiation.
Figure 4:
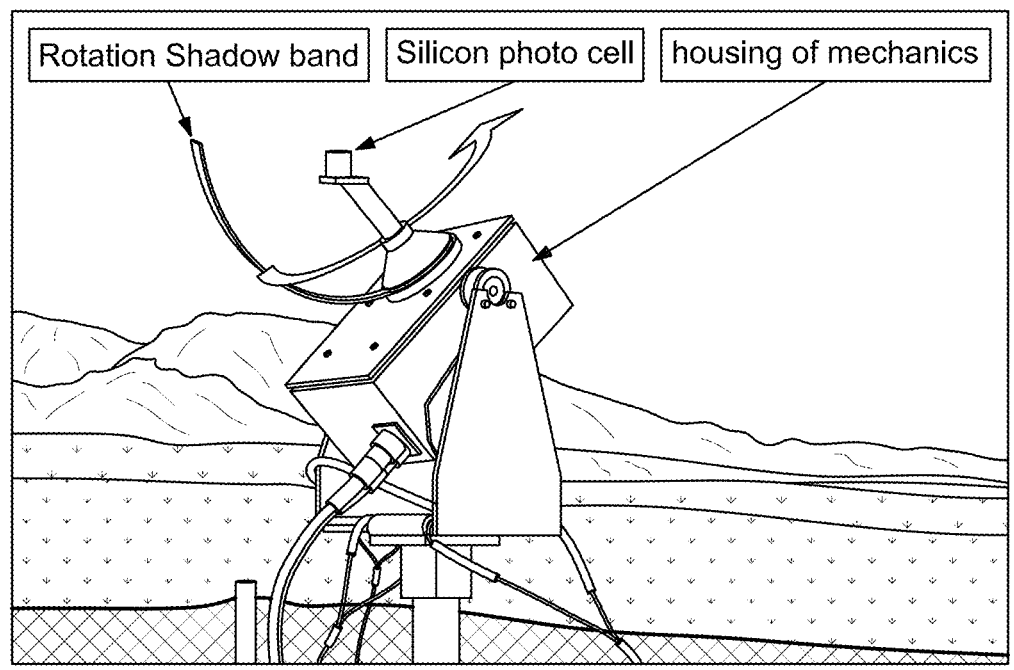
FIG. 4 illustrates an example of a rotating half circle shadow band.
Figure 5:
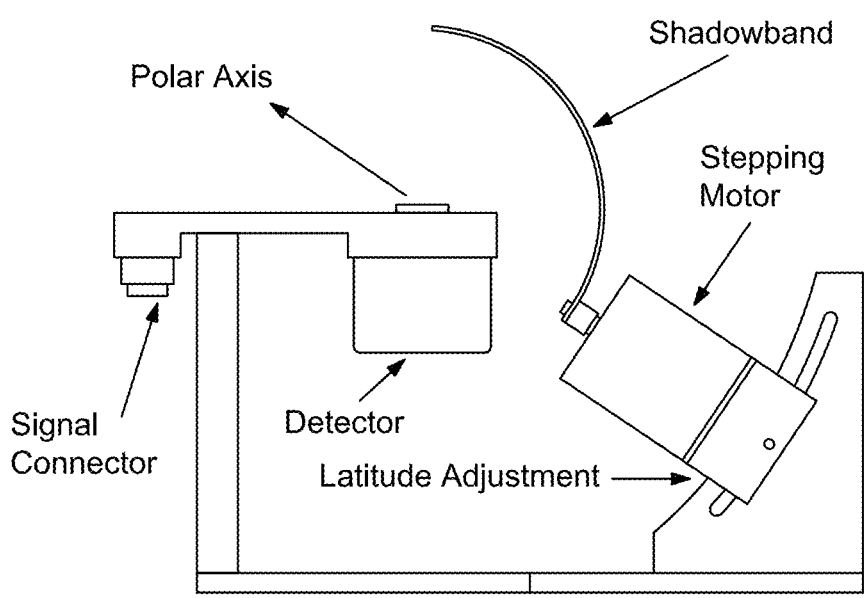
FIG. 5 shows the rotating half circle shadow band of FIG. 4 in cross-section.
Figure 6:
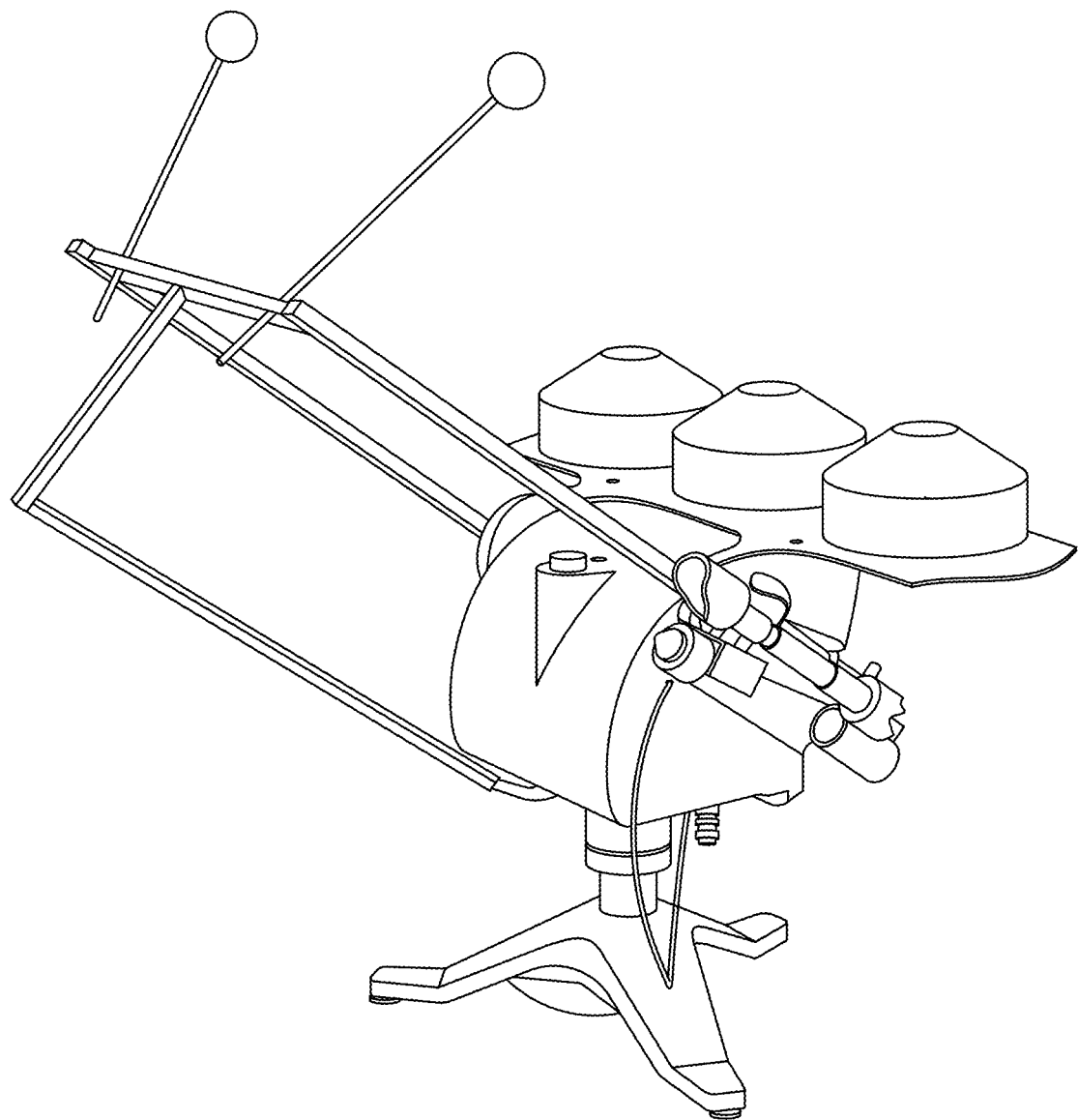
FIG. 6 illustrates an example of a tracking solar disk.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a rotating shadowband for measuring diffuse solar radiation.

The aspects of the present disclosure describe a rotatable shadowband configured to prevent direct sun radiation from reaching a pyranometer sensor head during the measurement of the diffuse radiation.

Figure 7:
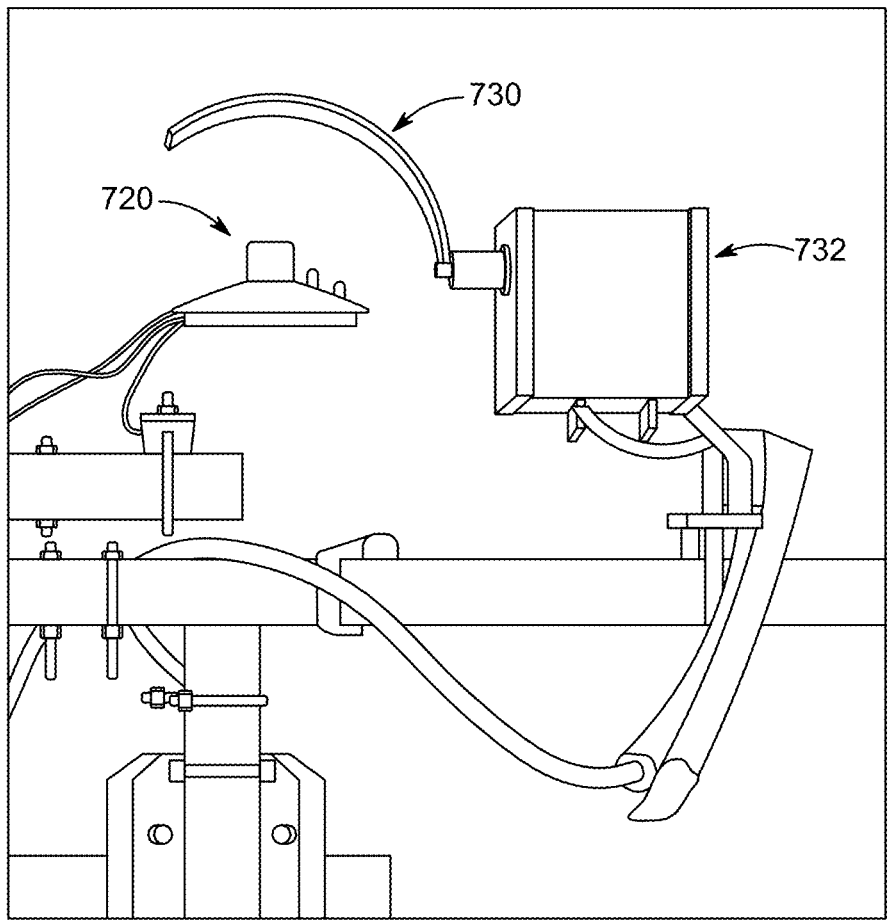
FIG. 7 illustrates an example of using a half circle shadow band.

A non-limiting example of preventing direct solar radiation from reaching a pyranometer is illustrated in FIG. 7 (See U.S. Pat. No. 6,849,842 B2, incorporated herein by reference in its entirety). An arrow points to the shadowband 730 which prevents direct solar radiation from reaching the pyranometer sensor head 720. The shadowband 730 has semicircular arc shape. This shadowband has a large motor housing 732 which may interfere with the diffuse radiation. Also, the shadowband 730 is wide and solid, so a large correction must be made in the diffuse radiation measurements in order to compensate for the radiation loss due to shading by the shadowband. Measurements taken using the shadowband shown in FIG. 7 have a high noise level, as the unsupported end of the shadowband 730 hangs and is subject to vibration from the wind and from rotational stress.

Figure 8:
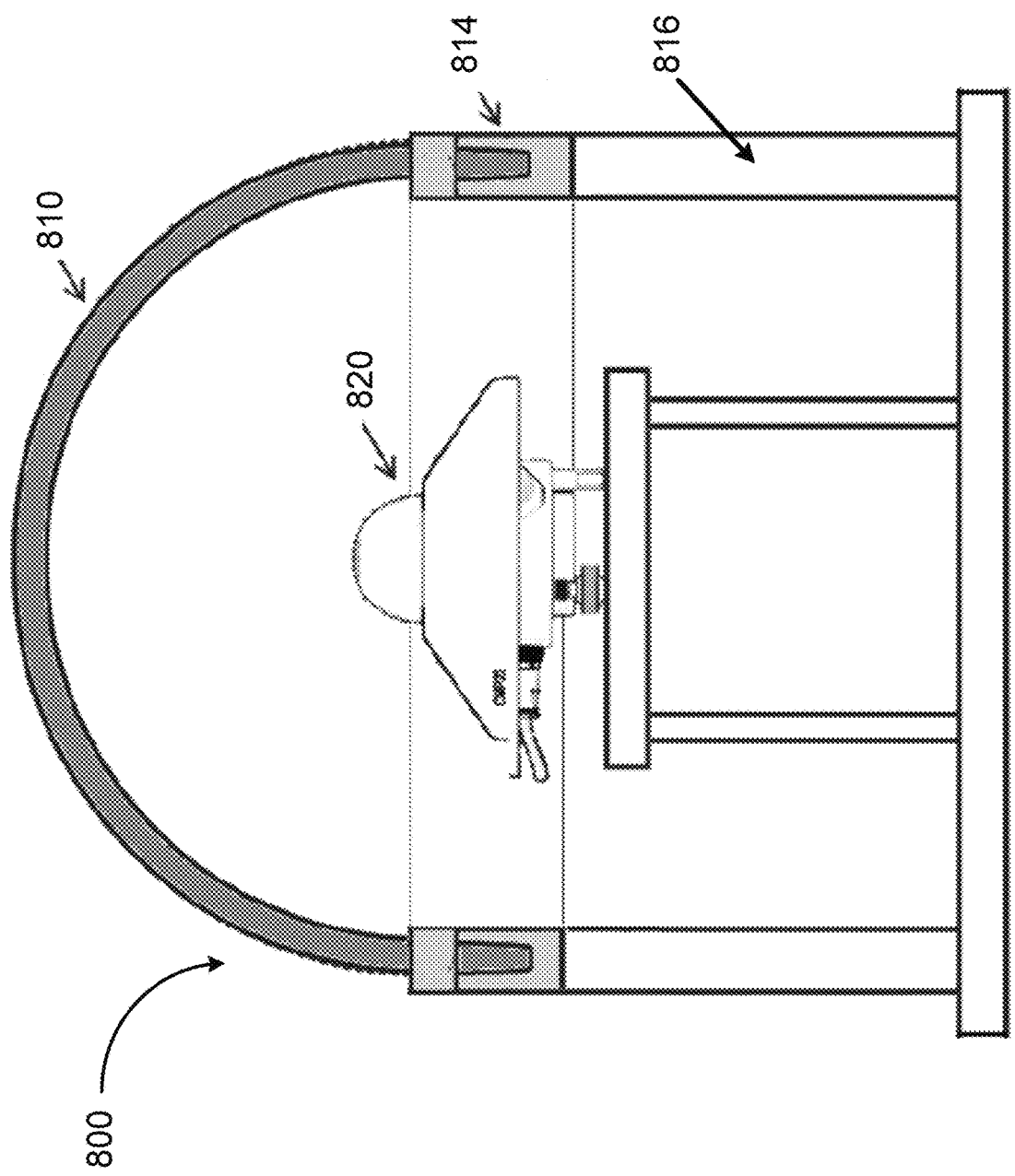
FIG. 8 illustrates the rotatable shadowband.

In an aspect of the shading device 800 of the present disclosure, a shadowband 810 forms a half circle that consists of a ring 814, where the shadowband is configured to rotate inside the ring as shown in FIG. 8. Shadowband 810 is supported at either end by the ring 814, therefore is not subject to rotational stress nor will it be affected by wind. A support 816 for the circular ring 814 includes a motor to rotate the shadow band 810 within the ring.

In order to measure the diffuse sky radiation, the shadowband 810 is in continuous circular rotation inside the circular ring 814. During one rotation the pyranometer 820 will take several fast readings. The lowest reading relates to the measurement window in which the direct sun radiation was fully blocked by the shadow ring during its movement.

In the embodiment of FIG. 8, the shading device 800 is configured to be used with an off-the-shelf pyranometer 820. A non-limiting example of a pyranometer which may be used in the present disclosure is the Second Class Pyranometer LP02, (see "User Manual LP02", Hukseflux Thermal Sensors, 2016, Delftechpark 31, 2628 XJ Delft, The Netherlands, incorporated herein by reference in its entirety).

The shadowband and ring can be made of any suitable material selected from the group of aluminum, plastic, stainless steel, titanium, iron, copper, tin and brass. However, for portability, the shadowband and ring are preferably aluminum which is lightweight yet structurally strong.

Figure 9A:
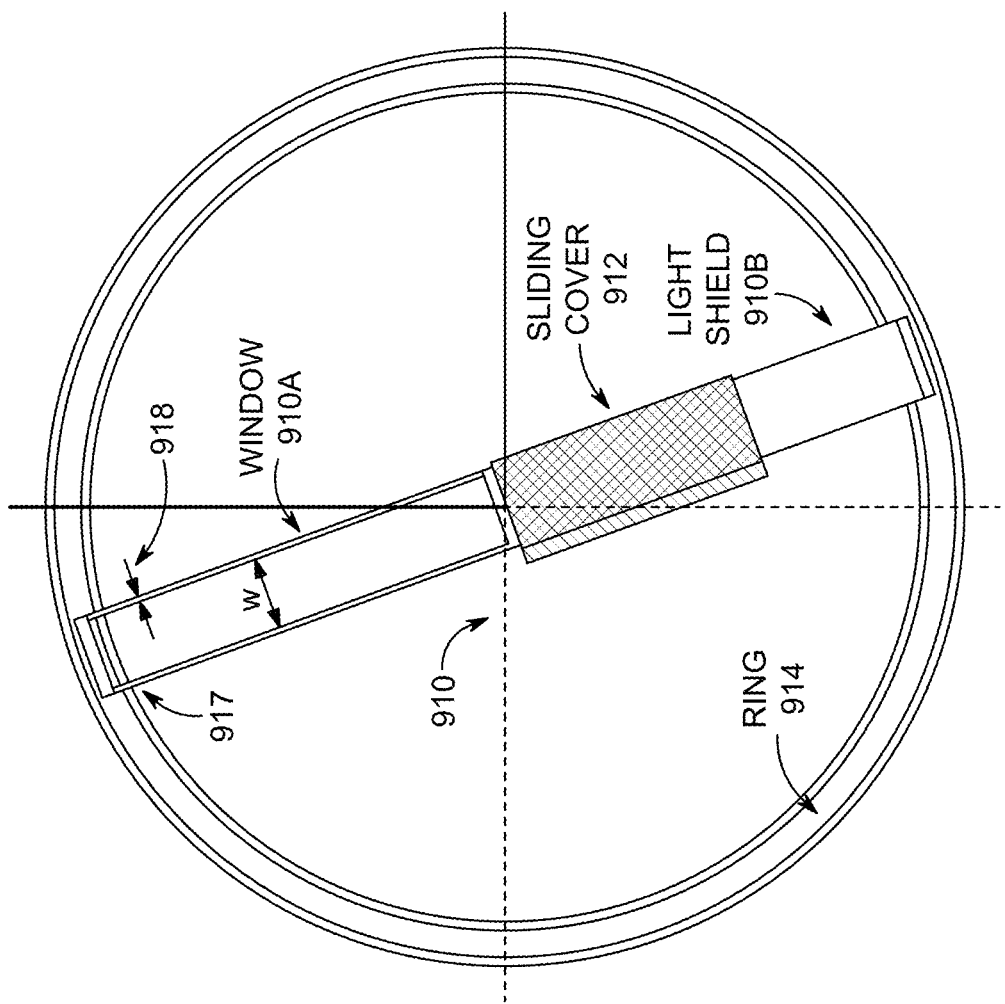
FIG. 9A shows a view of the shadowband and ring from above.

FIG. 9A illustrates the shadowband 910, which consists of three parts. Window 910A allows the radiation to pass for direct irradiation measurements. Light shield 910B shields the pyranometer 820 head from direct sunlight, allowing the measurement of the diffuse radiation. Sliding cover 912 is shown in its docked position, where the window 910A is uncovered. The ratio of the length of window 910A to the length of light shield 910 is 1:1 in the current embodiment. However, the ratio may be 0.9:1.1, 0.8:1.2 or as needed to provide structural support to the open window area at the apex of the curve. Additionally, the end 917 of the window area which contacts the ring 914 may be solid to provide structural support as shown in FIG. 9B. The solid end 919 of 917 may be up to 20% of the window area. Making this end solid does not affect the direct irradiation measurement appreciably as it is partially shaded by the ring and light passing through this end area is at an angle of close to 180 degrees with the pyranometer head, so would not be received as direct irradiation.

Figure 9C:
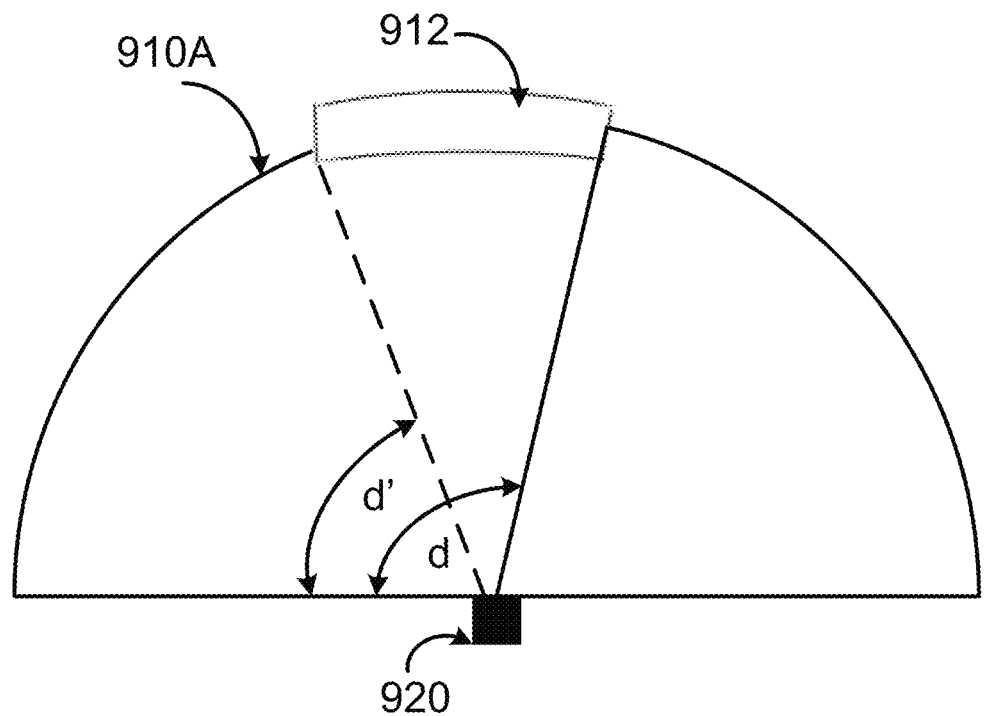
FIG. 9C shows the change in window opening due to the sliding cover.

Sliding cover 912 may be moved manually to cover a portion of the window 910A as shown in FIG. 9B. Covering a portion of the window to reduce the direct irradiation volume may be necessary on days of intense heat to protect the sensor head of the pyranometer from overheating. FIG. 9C shows the angle, d, subtended at the pyranometer 820 head due to the opening in the measurement window 910A. As the sliding cover attached to part 910A is moved, the window partially closes, moving to the position shown by the dotted line and to angle d'. The angle d' can range from 45 to 100 degrees due the movement of the sliding cover. The angle should be adjusted manually according to the highest altitude of the sun in the region. When the sun is at the apex of the sky, the direct irradiation at the pyranometer should be lowered to prevent overheating. The direct irradiation measurements can be corrected by accounting for the smaller window.

Correction of diffuse solar radiation measured under the shadow ($E^*_{DF}$) is estimated considering the ratio of blocked part ($E_b$) to the actual value of diffuse solar radiation ($E_{DF}$), according to the following relation:

$$\frac{E_{DF}}{E^*_{DF}} = (1 - (E_b/E_{DF}))^{-1} \tag{1}$$

Expression (1) is known as correction factor (Fc) and it can be estimated analytically by considering the diffuse solar radiation to be isotropic.

Since the field of diffuse solar radiation is seldom isotropic, the use of shadow-ring devices must take into consideration the effect caused by the anisotropy on the measurements.

Figure 9D:
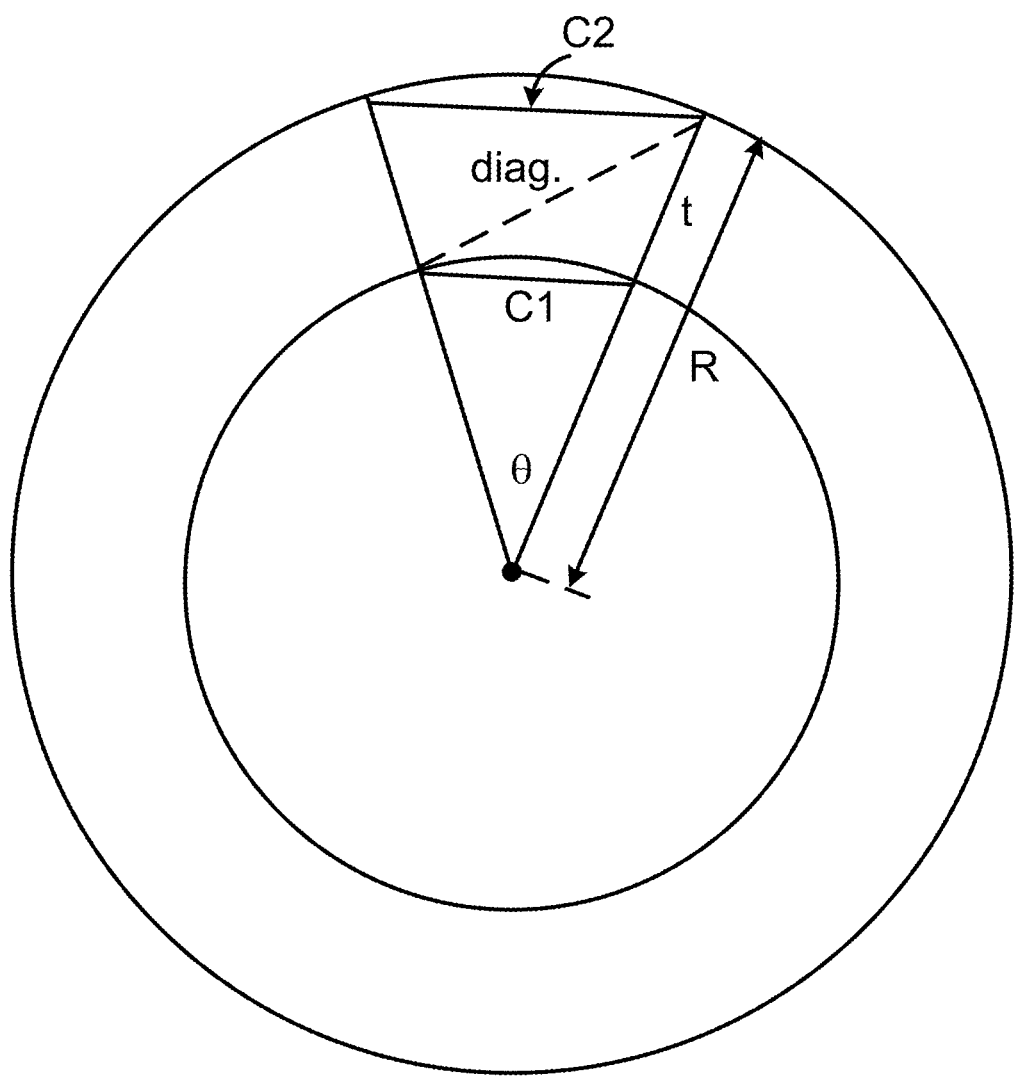
FIG. 9D shows a diagram for calculating the width of the shadowband.

The width, W, of the shadowband 910 of FIG. 9A should be as large as possible without interfering with the ring 914 walls during rotation. The width of the shadowband must be less than the diagonal of the trapezoid formed by the chords of the arc section of the inner surface of the ring as shown in FIG. 9D. The width W is given by:

$$W < \sqrt{\left(4R\sin\left(\frac{\theta}{2}\right) - 2tR\right)\sin\left(\frac{\theta}{2}\right) + t^2} \tag{2}$$

where R is the radius of the ring, t is the radial thickness of the ring and θ is the angle from the center of the ring to the ends of the arc.

Figure 10:
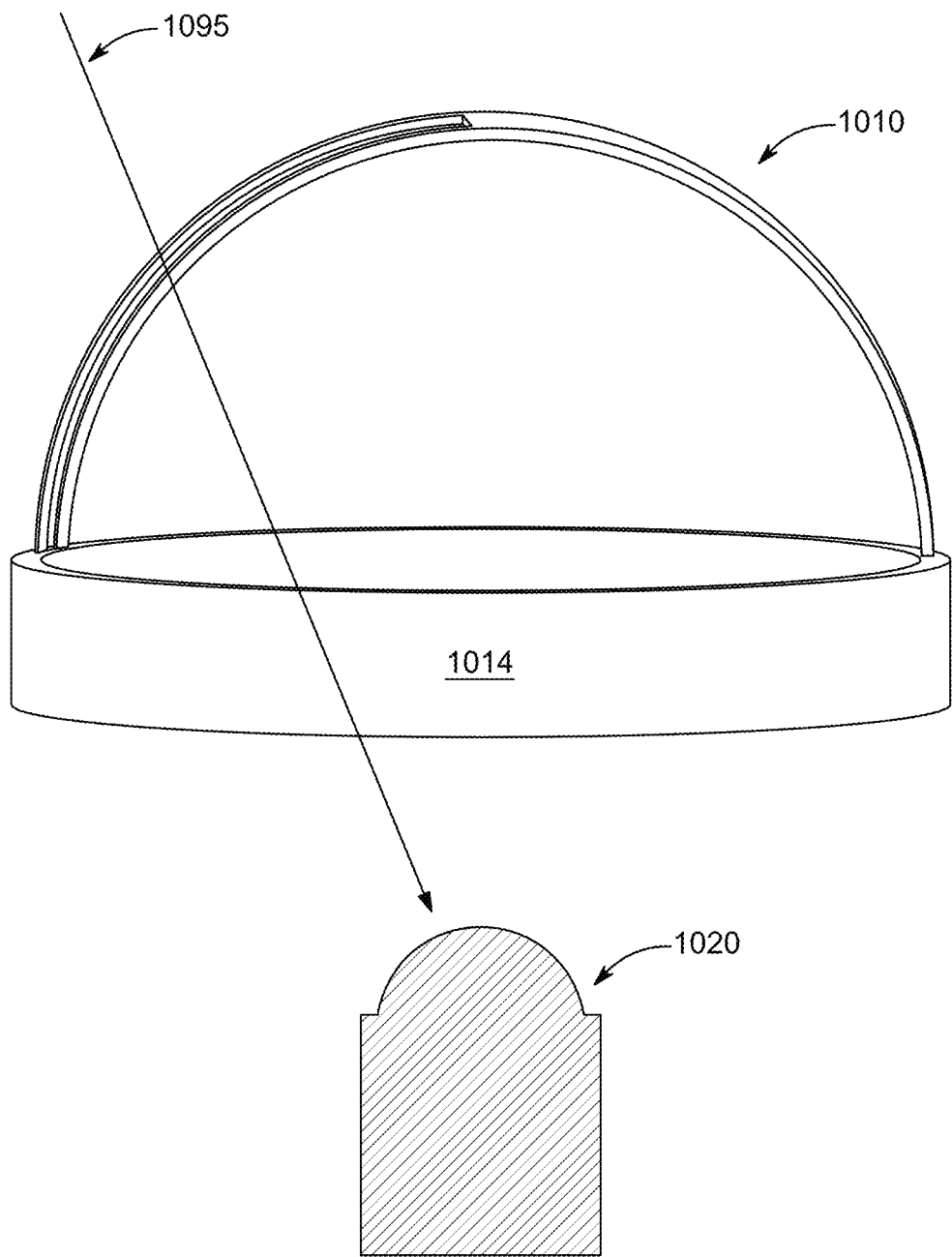
FIG. 10 shows a three dimensional view of the shadowband and ring from the side.

FIG. 10 shows the shadowband at an angle in which light can enter the window aperture on the left or be blocked on the right. As the shadowband spins within the ring 1014, direct radiation (shown as arrow 1095) alternately passes through the window and is blocked from passing as seen at the pyranometer head 1020. The pyranometer makes readings of the direct solar radiation, which do not need correction as almost all of the direct solar rays can pass through the window due to the thin sides 918 of the window.

Figure 11:
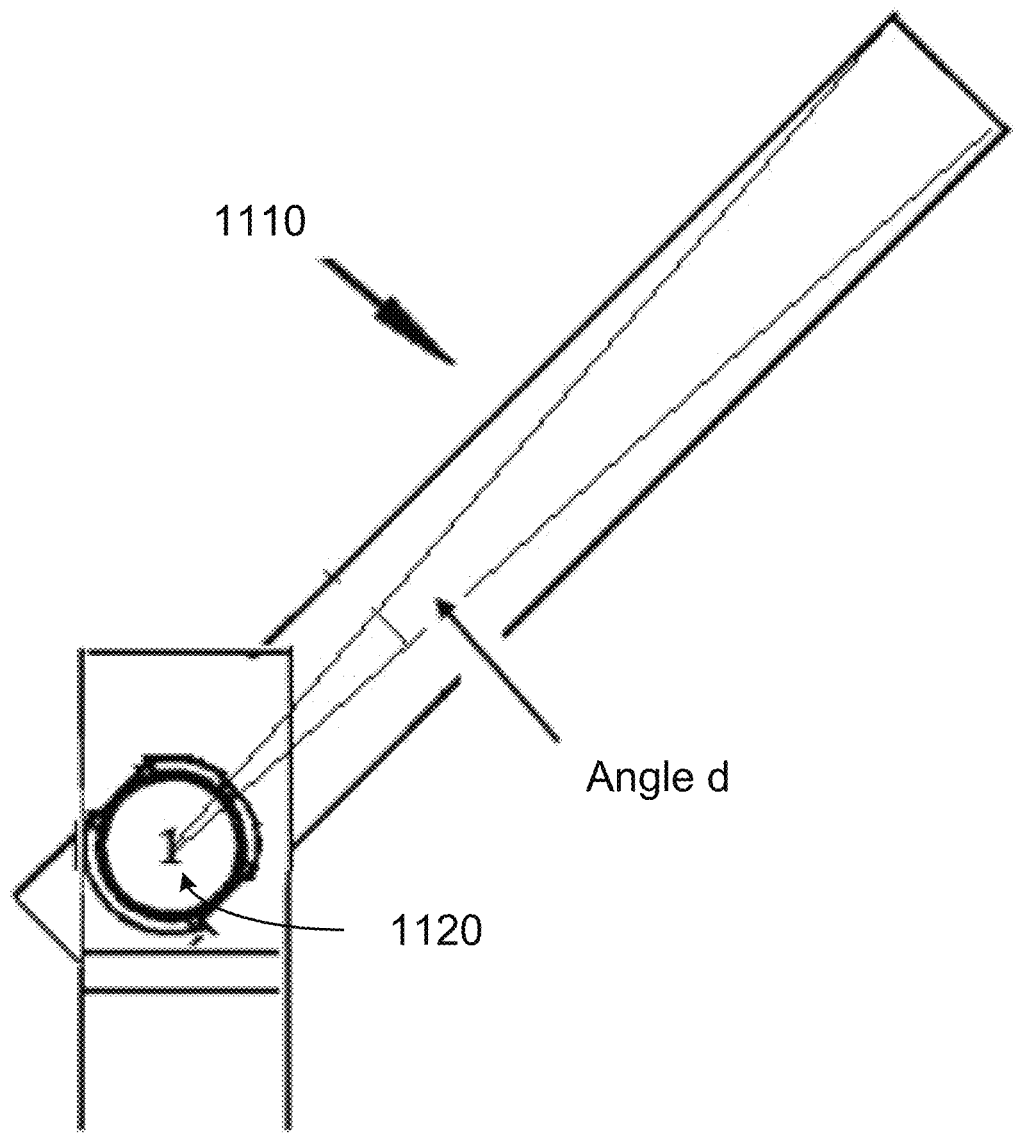
FIG. 11 shows the shadowband as viewed from the pyranometer sensing head.

FIG. 11 shows the angle of light blockage by the rotating shadowband 1110 as seen by the pyranometer sensing head 1120. The blocked area makes an angle d as seen by the pyranometer head. The blocked light volume is considered to be isotropic in intensity with the proximate diffuse radiation and is compensated in the diffuse radiation measurements.

Figure 12A:
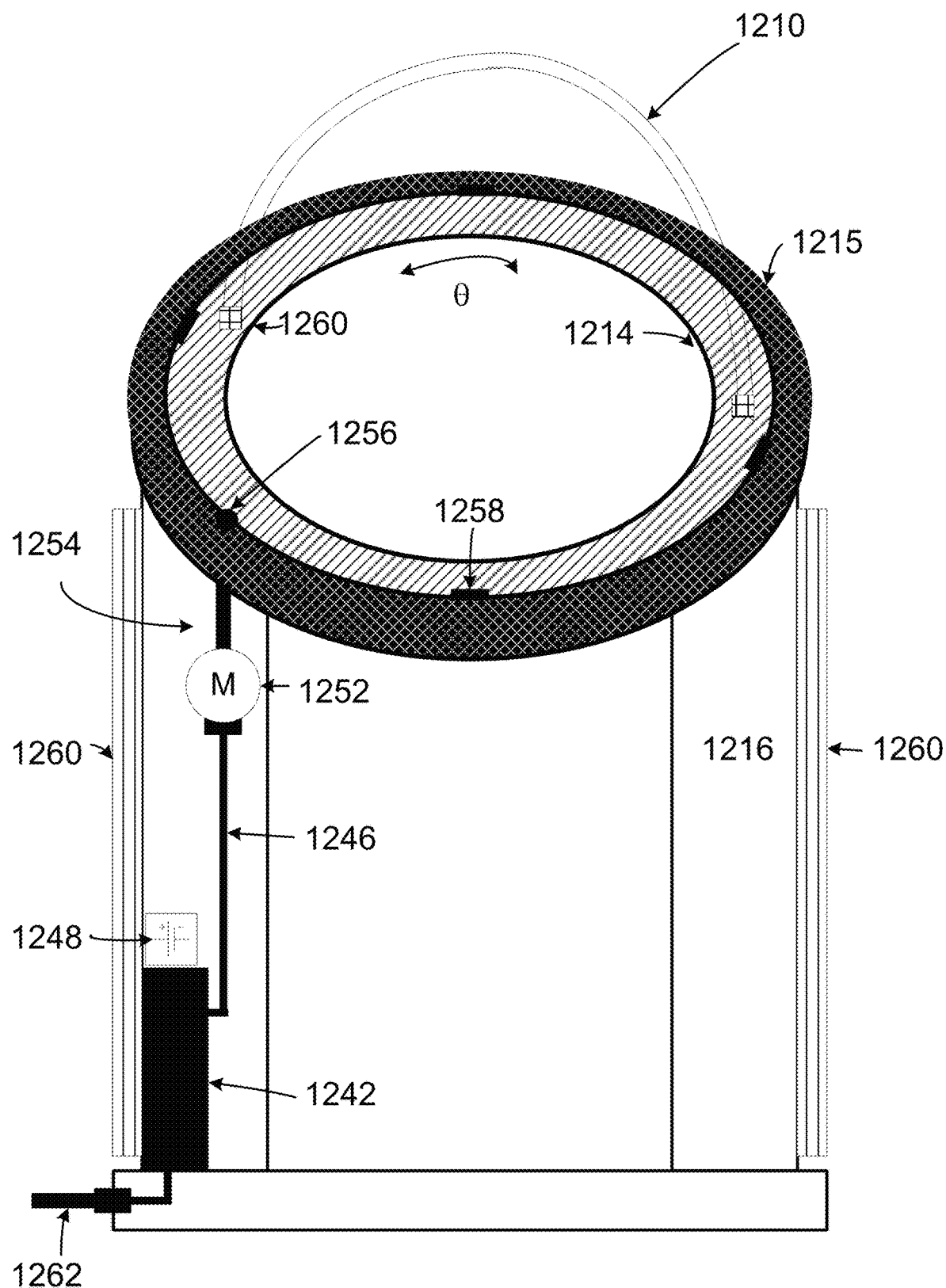
FIG. 12A shows the support and electronics for rotating the ring with a vertically turning shaft.
Figure 12B:
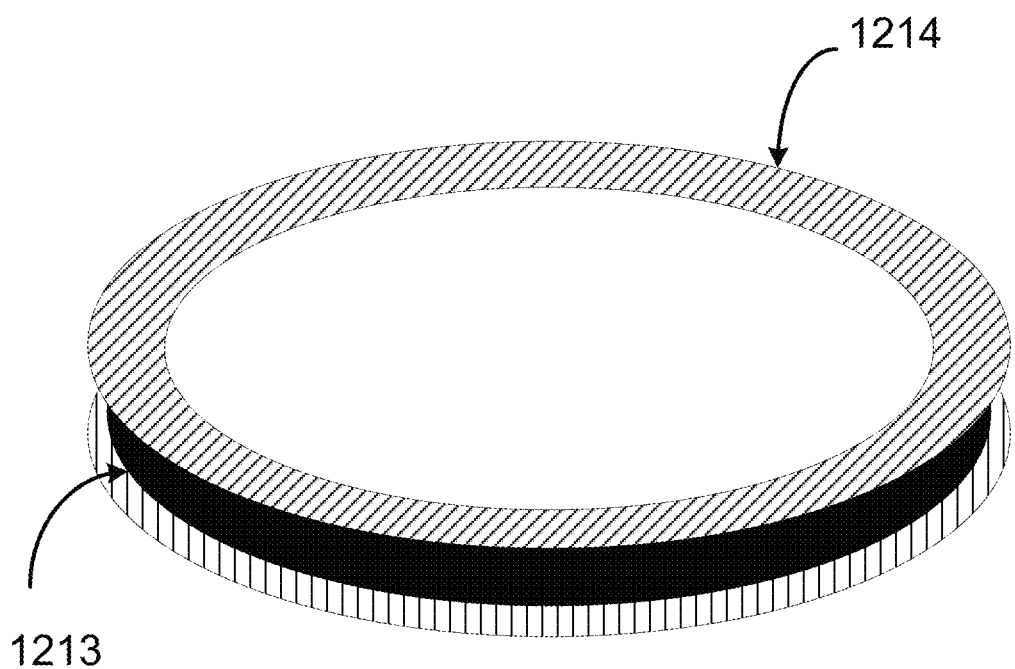
FIG. 12B shows the cylindrical ring with a bushing.

In order for the shadowband 1210 to rotate, the ring 1214 may be fitted within an outer ring 1215 as shown in FIG. 12A. Bearings 1258 on the radially inner edge of the outer reduce friction as the ring turns and maintain spacing between the two rings. The outer ring is kept stationary and a motor shaft 1254 is partially embedded in a channel in the outer ring. The motor shaft is configured with a rubber head 1256 which partially extends into the space between the ring 1214 and outer ring 1215. When the motor shaft turns, the head 1256 rotates and pushes against the radially outer edges of the ring 1214, rotating the ring. The ring has a radially outer channel fitted with a rubber bushing 1213 for engaging with the rubber head 1256 as shown in FIG. 12B. The shadowband 1210 is fixed at either end to the ring 1214 by brackets 1260. Motor 1252 may connected by motor shaft 1254 to the outer ring 1215 as shown in FIG. 12A.

Figure 12C:
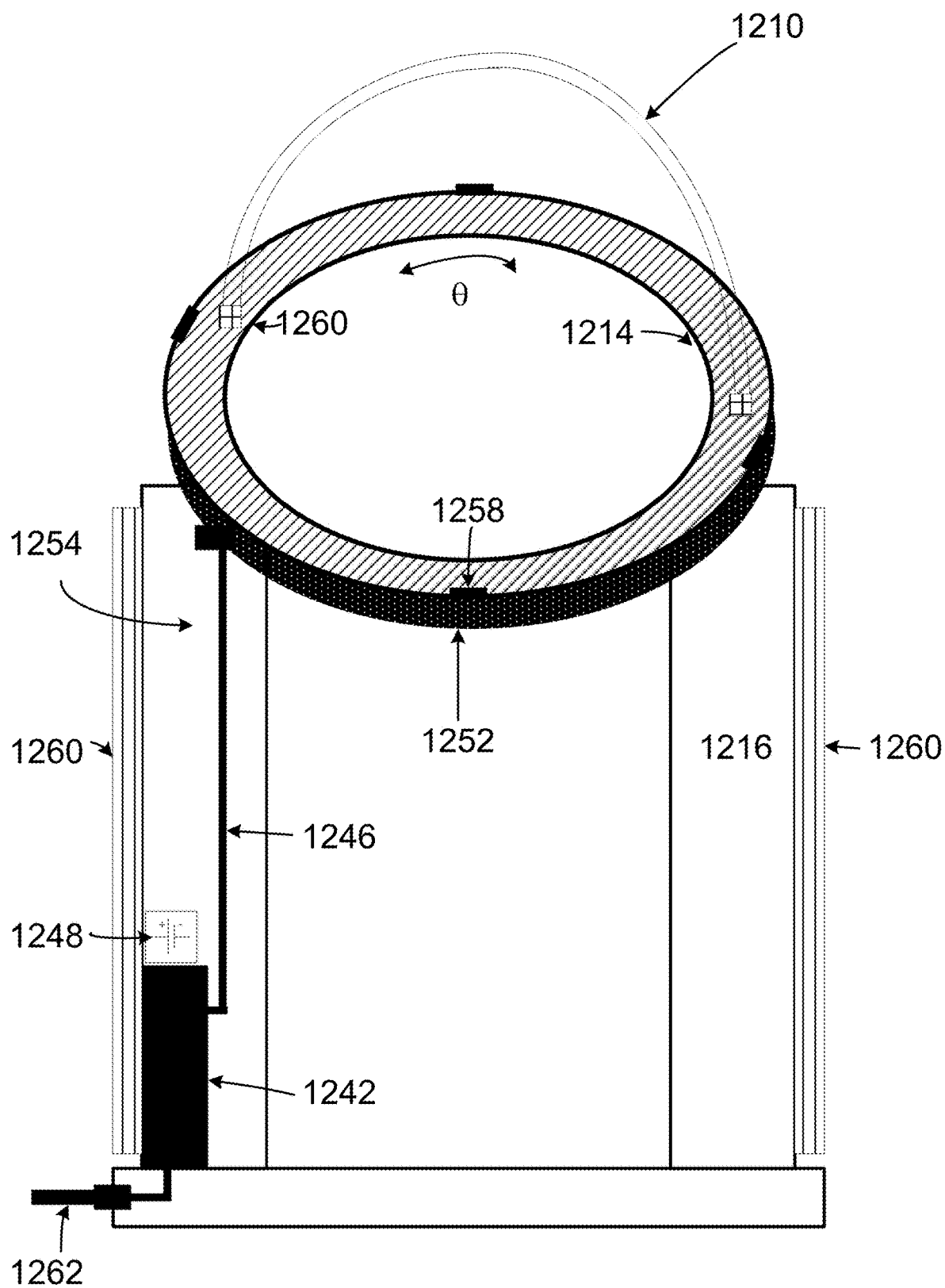
FIG. 12C shows the support and electronics for rotating the ring with a brushless DC motor.

Alternatively, motor 1252 may be a DC brushless frameless motor ring, where the stator is connected to the top of the support and the rotor is connected to the underside of the cylindrical ring as shown in FIG. 12C.

The motor 1254 is preferably a brushless DC motor and includes a stator and rotor. The rotor includes a plurality of permanent magnets and the stator includes coiled wiring through which electricity is passed to create a magnetic field to turn the rotor. The motor is connected to controller 1342. The controller contains the necessary hardware, software, and memory to implement overall operation of the rotating shadowband. The motor operates when the controller provides drive signals in the form of electricity to the stator, and a magnetic field is established that interacts with the magnetic field of the permanent magnets of the rotor. In a non-limiting example, the motor may be a Celera DC brushless frameless motor. Celera DC brushless frameless motors are available from Celera Motion World Headquarters, 125 Middlesex Turnpike, Bedford, Mass. USA as shown in FIG. 7B.

Figure 15:
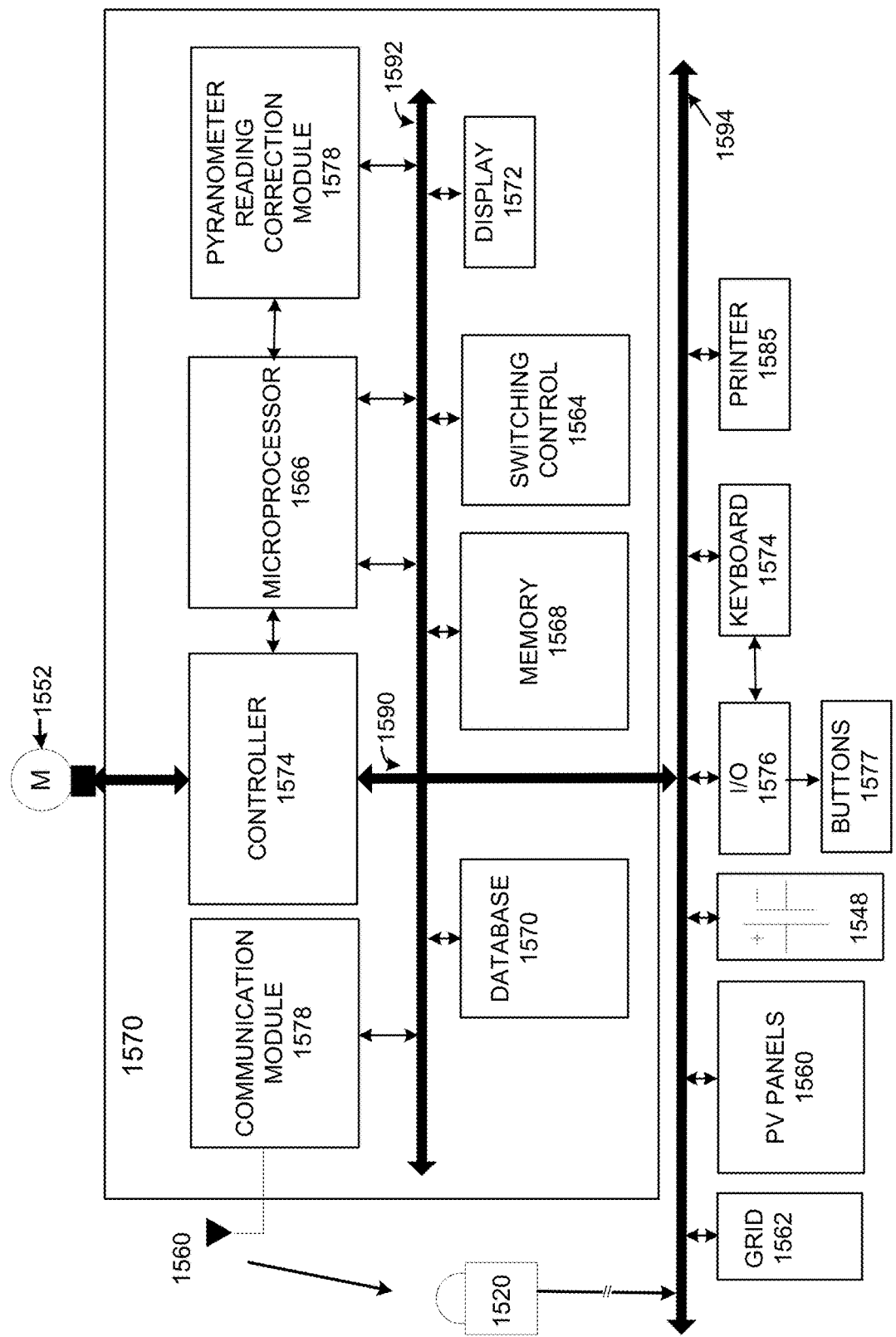
FIG. 15 shows a control system.

Support 1216 may be cylindrical or have support legs. Support 1216 contains at least a hollow cavity for holding the electronics that operate the shadowband. Motor 1252 is electrically connected by wiring cable 1246 to controller 1242. Controller 1242 is powered by either a grid connection 1262, such as at night when battery 1248 may be depleted, or by battery 1248. The controller circuitry is configured for determining a state of charge of the battery and recharging the battery using current from the solar panels or the grid when the battery charge falls below a threshold level. Controller 1242 has inverter circuitry configured to receive power from solar panels 1260 and convert this power for use in turning the motor or storing excess power in the rechargeable battery 1248. In operation, the controller is configured with a microprocessor 1566, memory 1568, database 1570 and program instructions as shown in FIG. 15 for determining whether to use grid power, direct power from the solar panels 1260, battery power or to recharge the battery 1248. The controller may also be configured with buttons (not shown) on its outer housing as user inputs for turning the motor on and controlling its speed and starting direction. Alternatively, the controller may be connected in a wired or wireless manner to an external computer (not shown) for receiving user inputs. The controller may be connected in a wired or wireless manner to the pyranometer to receive information regarding the measurement frequency. The controller may adjust the speed of rotation of the shadowband based on the measurement frequency. FIG. 15 depicts the controller as applied to the aspects of the present disclosure and FIG. 16-19 depict details of the controller.

For certain latitudes, when the sun is nearly at angle of nearly 90 degrees above the ground, the shadowband will always block the sun, and the direct and diffuse readings would be the same during the rotation of the ring. Therefore, an external sensor may be used to measure the global solar radiation.

Figure 13A:
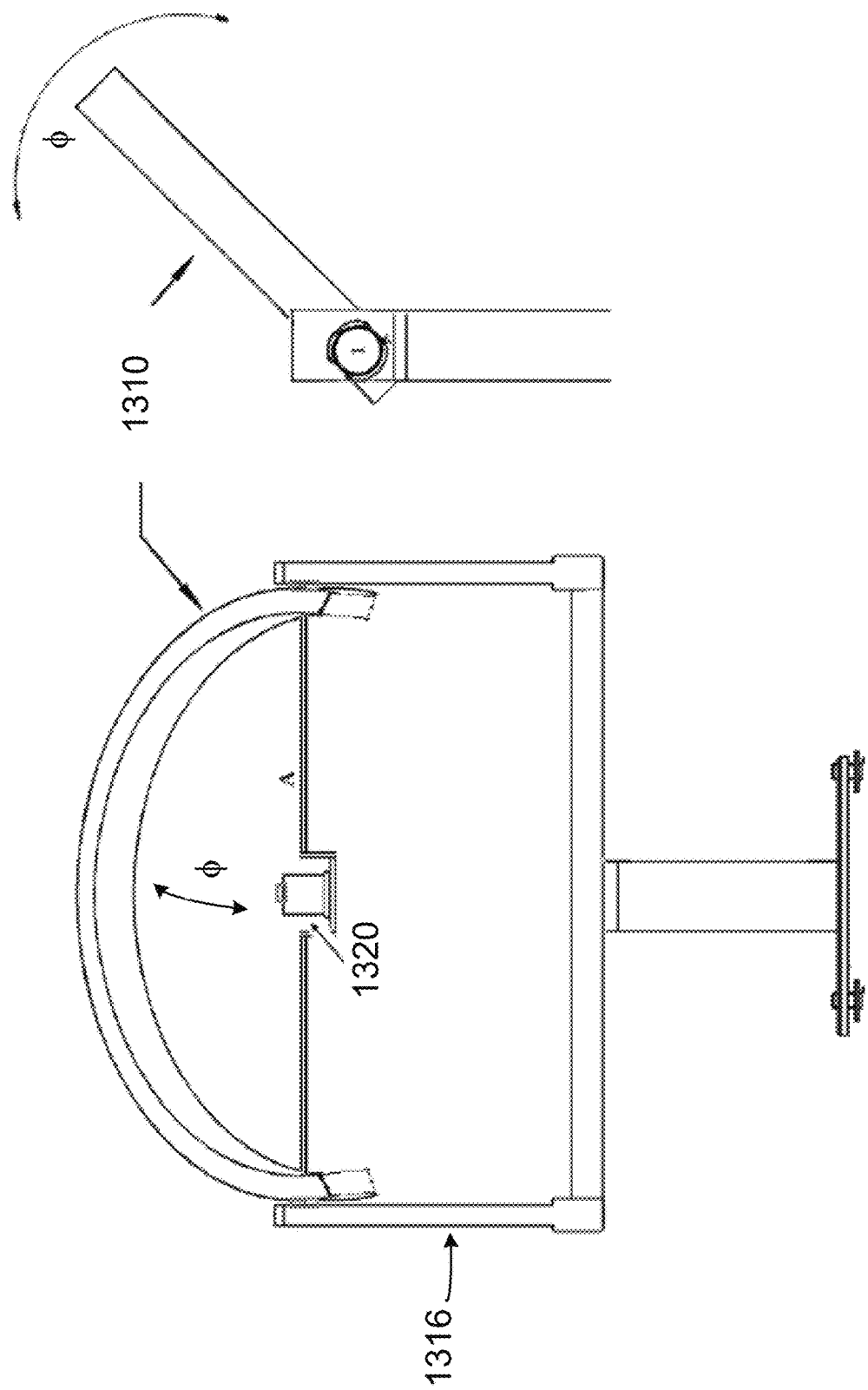
FIG. 13A illustrates the view as seen by a pyranometer of the rotation of a solid shadowband.

In an alternative of the present disclosure, a solid shadowband may be used as shown in FIG. 13A. The shadowband is connected to ring 1314 by a pivot connection through both the ring and the shadowband and can be moved within the ring 1314 over an angular range of $\phi$ of 0 to 360 degrees in order to measure the global solar radiation when $\phi$ is 0 degrees. Diffuse radiation measurements will be the lowest reading during the movement of the shadowband from an angle of 0 degrees to an angle of 180 degrees. When not in use, the shadowband can be stowed flush within the ring. The pyranometer 1320 may be connected by wiring threaded through the centers of pivot joints 1319 to connect to the controller 1342 as shown in FIG. 13B.

Figure 13B:
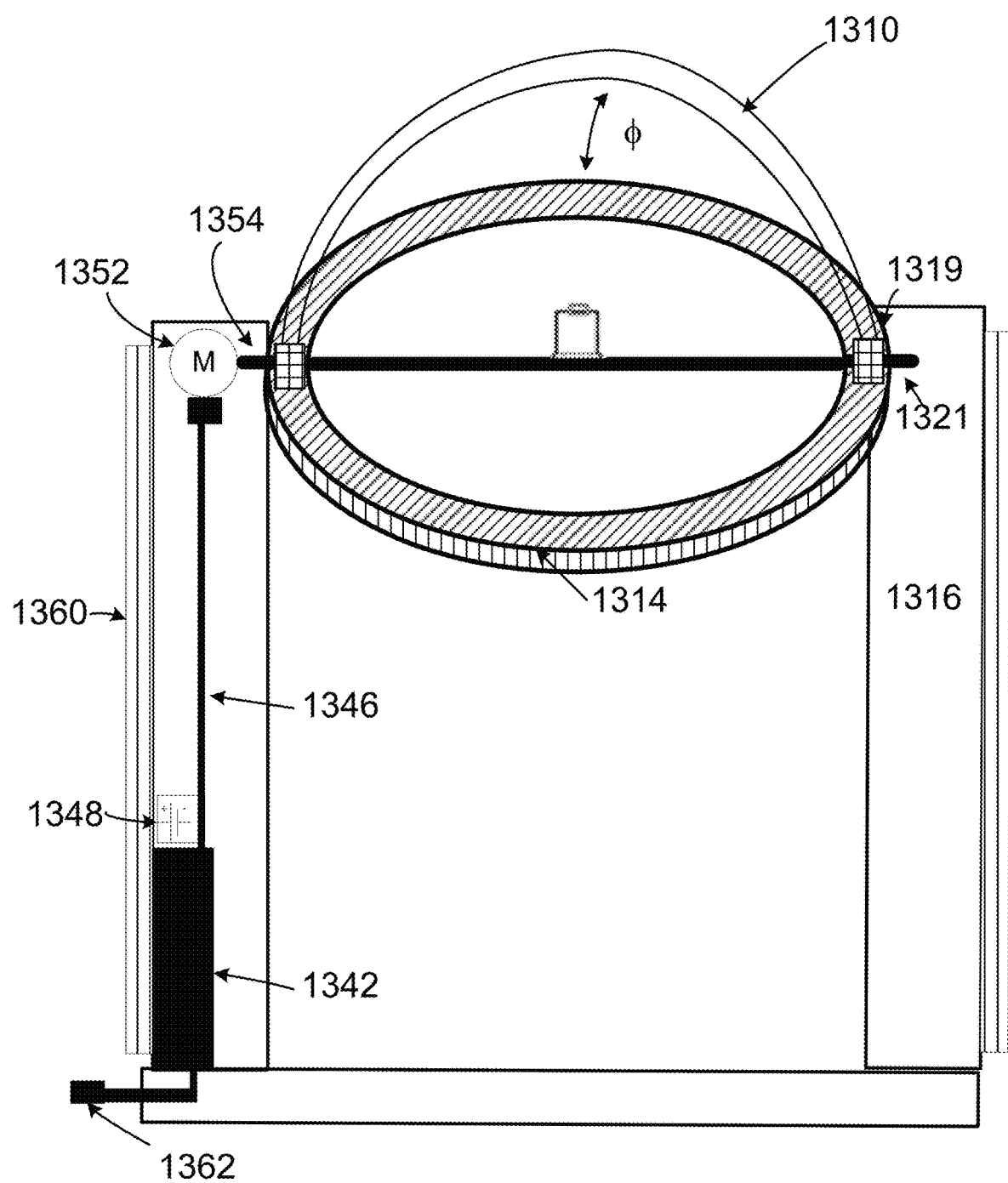
FIG. 13B shows the support and electronics for rotating the ring with a pivoting shaft.

As shown in FIG. 13B, a motor 1352 is connected to shaft 1354 to provide the pivoting action of the ring. Brackets 1319 connect the shadowband 1310 to the ring 1314 and hold the motor shaft. The motor 1352 is configured through control electronics to move the shadowband 1310 from perpendicular to the ring 1314 to lying in the plane of the ring.

Support 1316 may be cylindrical or have support legs. Support 1316 contains at least a hollow cavity for holding the electronics that operate the shadowband. Motor 1352 is connected by shaft 1354 to the outer ring 1314. Motor 1352 is electrically connected by wiring cable 1346 to controller 1342. Controller 1342 is powered by either a grid connection 1362, such as at night when battery 1348 may be depleted, or by battery 1348. Controller 1342 has inverter circuitry configured to receive power from solar panels 1360 and convert this power for use in turning the motor or storing excess power in the rechargeable battery 1348. In operation, the controller is configured with a microprocessor 1566, memory 1568, database 1570 and program instructions as shown in FIG. 15 for determining whether to use grid power, direct power from the solar panels 1360, battery power or to recharge the battery 1348. The controller may also be configured with buttons 1577 on its outer housing or in a separate I/O peripheral as user inputs for turning the motor on and controlling its speed and starting direction. Alternatively, the controller may be connected in a wired or wireless manner through communication module 1578 having antenna 1560 to an external computer (not shown) for receiving user inputs. The controller may be connected in a wired or wireless manner to the pyranometer 1320 to receive information regarding the measurement frequency. The controller may adjust the speed of rotation of the shadowband based on the measurement frequency. FIG. 15 depicts the controller as applied to the aspects of the present disclosure and FIG. 16-19 depict details of the controller.

Figure 14A:
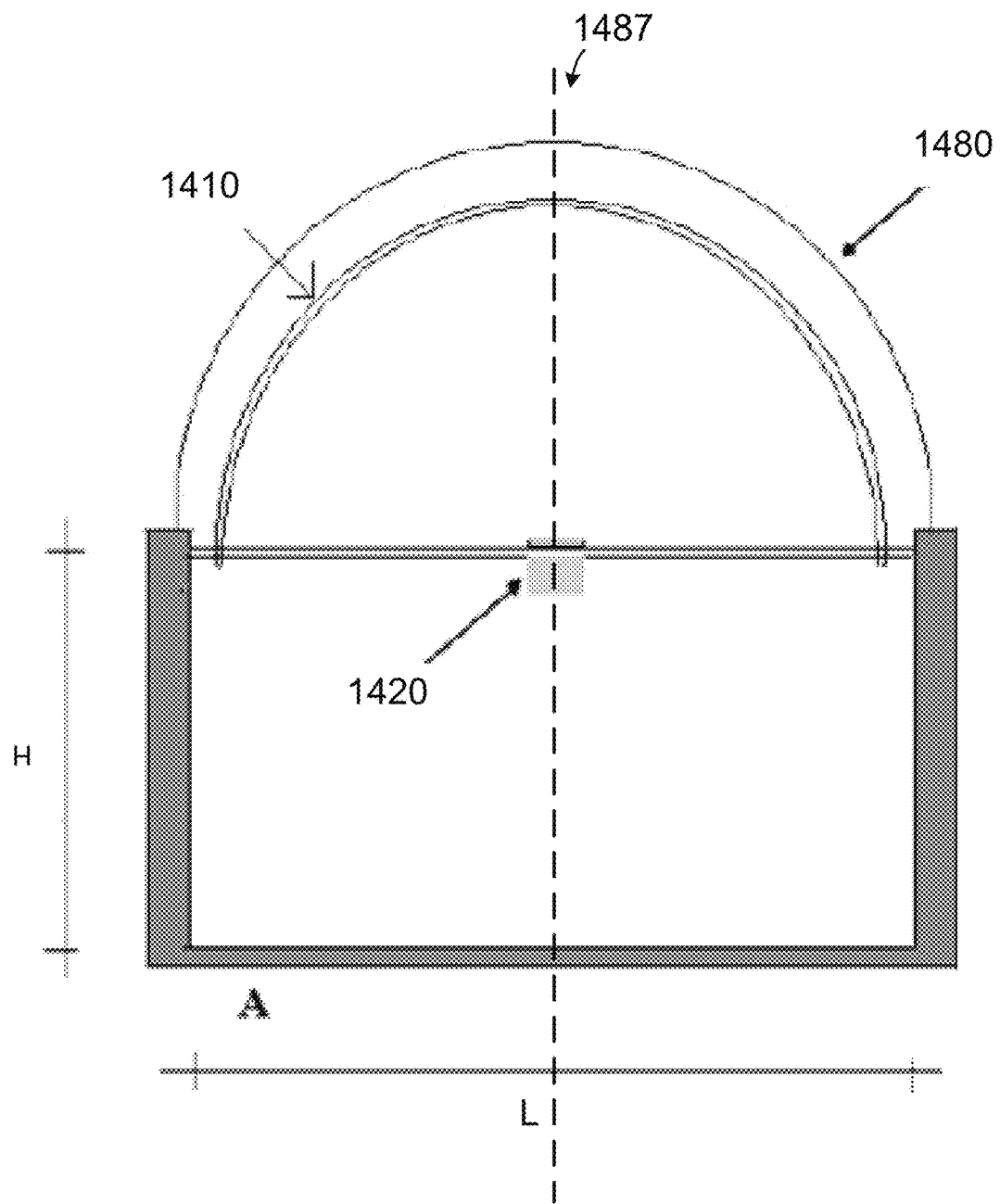
FIG. 14A illustrates the dome, pyranometer and shadowband in a support.
Figure 14B:
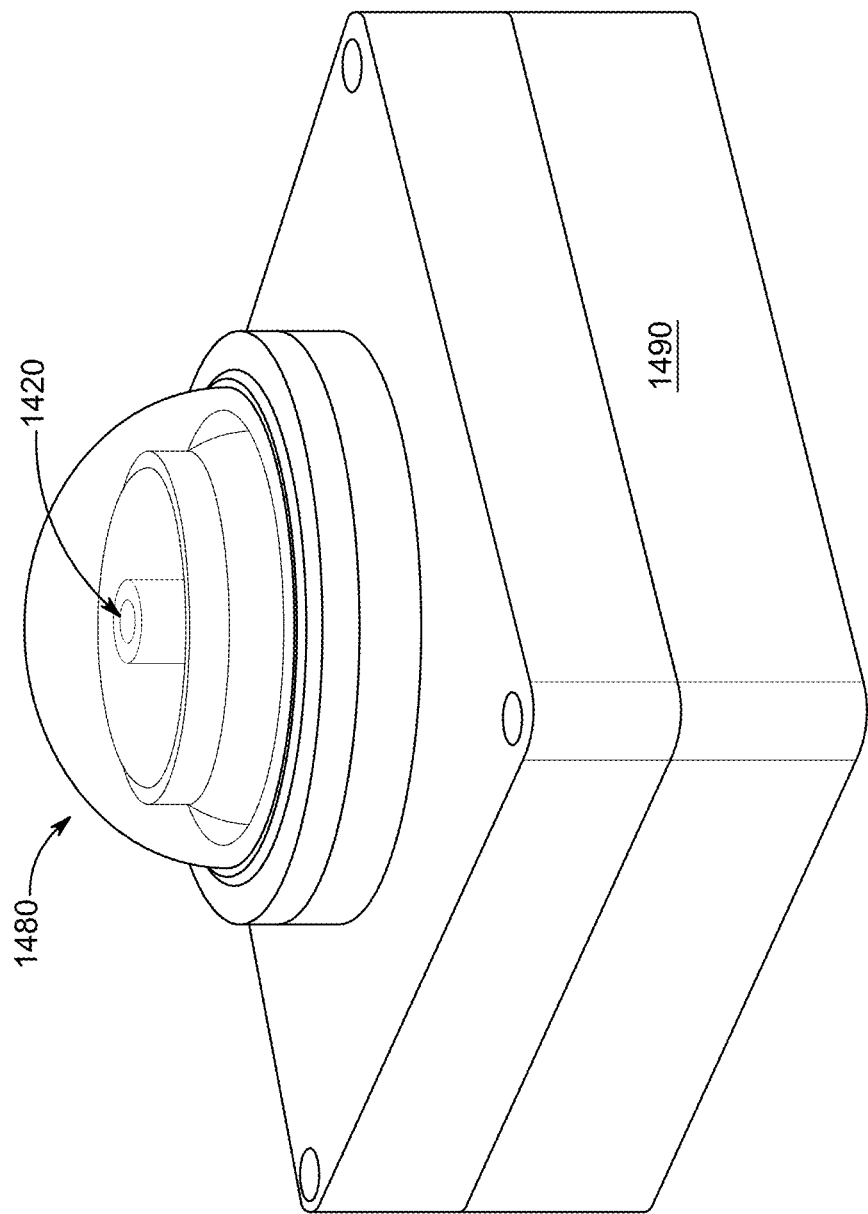
FIG. 14B shows an integrated pyranometer with a rotating shadowband and a dome.

In a further aspect of the present disclosure, the shading device of FIG. 13A-13B may be integrated with a pyranometer and fitted with a semicircular glass dome. This device may be much smaller than the previously mentioned devices. FIG. 14A illustrates the rotating shadowband of FIG. 13B enclosed in glass dome 1480. FIG. 14B shows the glass dome 1480, pyranometer 1420 and electronics housing 1490.

The shadowband of the integrated device of FIGS. 14A, 14B has a similar configuration to that of the shadowband shown in FIG. 13A-13C, where the apex of the shadowband has been rotated from upright to fully stowed. The shadowband may rotate through an angle of 0 to 180 degrees or 0 to 360 degrees, depending on height specifications. However, the integrated device of FIGS. 14A, 14B is much smaller and the shadowband is enclosed by a glass dome. In a non-limiting example, the height of the device may be only 8 cm and the length may be only 16 cm.

A control system 1570 for the motor 1552, battery 1548, solar panels 1560 and connection to grid is shown in FIG. 15. Battery 1548 is a rechargeable battery which may be charged with energy from the solar panels 1560 (photovoltaic panels) or from the grid 1562.

Controller 1574 may receive power from the grid 1562, the PV panels 1560 or the battery 1548. Controller 1574 may actuate a switch box 1564 to control the connection to the grid 1562, the PV panels 1560 or the battery 1548. Bus lines 1590, 1592 and 1594 carry both power and communication wiring.

The controller 1574 receives the pyranometer 1520 readings from the communication module or alternatively directly though bus line 1594. The controller sends the readings to the microprocessor for correction in the correction module 1578. The readings may be shown on display 1572 or printed as a graph on printer 1585. The display may be a simple display, such as a series of lights showing colors related to the intensity of global radiation and diffuse radiation, may show a digital reading regarding the intensities, or may be a computer monitor displaying charts, graphs or other presentations of information. For example, the display may show a graph of intensity over time for a variety of measurement angles, and identify the regions of direct and diffuse radiation.

The control system 1570 of the above-described rotating shadowband device uses the single light sensor of the pyranometer 1520 to measure three components of sunlight, namely, total horizontal, direct normal and horizontal diffuse irradiance. These are related by the equation:

$$T_h = \text{Dif}_h + \text{Dir}_n \cos(Z) \qquad (3)$$

where Th, the total irradiance measured on a horizontal surface; $\text{Dif}_h$, the diffuse irradiance (skylight) on a horizontal surface; $\text{Dir}_n$, the direct normal irradiance (sunlight directly incident on a surface facing the sun); and Z, the sun's zenith angle, the angle measured from straight overhead down to a sight-line to the center of the sun.

In the present disclosure, for the alternatives of FIG. 9A and FIG. 12A-12C, the controller is programmed so that once per minute the shadowband rotates within the ring. The light passes over the pyranometer sensing head and is blocked depending on whether the window area or the solid area of the band are in the direct path of the sunlight. The shadowband rotates through an angle of 360 degrees, alternately blocking the sunlight and allowing the sunlight to pass through the window.

For the shadowband of FIG. 13A-13B, the controller is programmed so that once per minute the shadowband passes over the light sensor, traveling approximately 180 degrees from a first stowed position to a position where the apex of shadowband is normal to the ring and on to a second stowed position wherein the shadowband is again in the plane of the ring. On the next rotation, the band rotates in the reverse direction.

One pass takes approximately one second. During this one-second period the pyranometer signal is sampled by light detector 56 about 700 times. The minimum pyranometer reading occurs when the sun is completely occluded by the band. The stream of high sample rate irradiance data is processed to measure the horizontal diffuse irradiance. With $T_h$, $\text{Dif}_h$ and Z known, $\text{Dir}_n$ is calculated.

Figure 20:
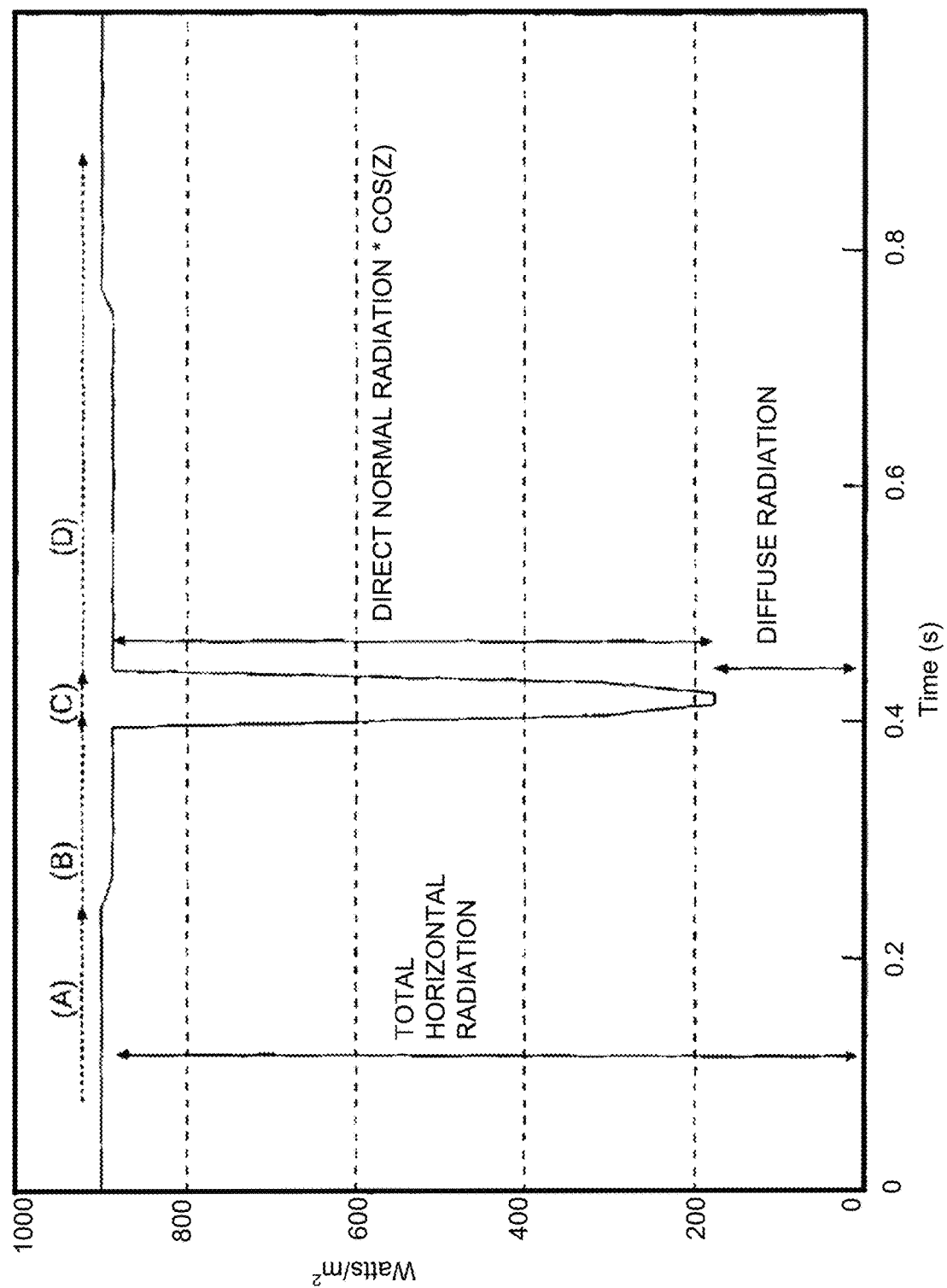
FIG. 20 is a graph illustrating pyranometer measurements obtained by using the rotating shadowband.

Referring now to FIG. 20, a graph is depicted illustrating measurements during a single band rotation on a clear day, the pyranometer views the full sky while the band travels from its stowed position below and to one side of the sensor, up to the horizon (A). As the band traverses its path above the horizon, it blocks a small strip of the sky, reducing the diffuse irradiance falling on the sensor (B). The irradiance measurement drops dramatically when the band shades the sensor from direct sunlight (C). A symmetrical pattern occurs as the band completes its revolution, ending in its stowed position below and to the other side of the pyranometer or completes one revolution of the angle θ of FIG. 12 or the angle φ of FIG. 13C.

A graph of intensity versus time in seconds for different measurement angles is shown in FIG. 20. The time window A shows the measurement of direct global irradiation, when the pyranometer is not blocked by the shadowband. The window B shows the measurements as the pyranometer begins to be blocked by the shadowband. This measurement is decreased by a correction factor of cos(Z), where "Z" is the angle of the zenith of the sun as seen by the pyranometer. The time window C shows the measurement when the shadowband fully blocks the pyranometer from receiving direct radiation. In this time window, the measurement is for diffuse or scattered radiation only. The time window D shows that the shadowband is no longer fully blocking the pyranometer.

During the continuous rotation of the shading, the sensor will take several readings. When the apex of the rotating shadowband 1310 is even with the horizontal axis (A), the readings will be the "Global Solar Radiation". When the rotating shadowband is above the horizontal axis (A) and its apex is aligned with the sun, a lowest reading will be the "Diffuse Radiation", as the shading ring completely obstructs direct solar radiation from reaching the sensor.

The amount of "Total Horizontal Radiation" can be found by subtracting the diffuse radiation from the global radiation:

$$\text{Direct Solar Radiation} = \text{Global Radiation} - \text{Diffuse Radiation} \qquad (4)$$

A first embodiment is illustrated with respect to FIG. 8 to FIG. 20. The first embodiment describes a rotating shadowband 800 for shading a pyranometer 820, comprising a support structure 816 including a base, a top surface, a hollow interior and side walls 1216, a first cylindrical ring 814 connected to a bracket to the top surface, a semicircular shadowband 810 held by the cylindrical ring, a motor 1252 configured for rotating the shadowband, a rechargeable battery 1248, and a controller 1242 having circuitry configured to power the first motor to rotate the semicircular shadowband.

The rotating shadowband includes at least one solar panel 1260 mounted to the sidewalls and electrically connected to the controller, wherein the controller is configured to use current generated by the at least one solar panel to power the motor and recharge the battery. The controller is further configured to determine a state of charge of the battery, compare the state of charge to a threshold and recharge the battery using current generated by the solar panel. The controller may be further configured to receive current from a grid power source 1262 electrically connected to the controller. The controller includes switching circuitry configured to switch between the power source, the at least one solar panel and the battery to power the motor.

The shadowband has a length, a width, W, a center, an apex at the center, a first end 917 and a second end and the first and the second ends are attached to the cylindrical ring by a first and a second bracket 919 respectively. The shadowband includes a window opening 910A, wherein the window opening substantially extends from a center of the band to the first end 917. A sliding cover 912 may be attached to the shadowband, wherein the sliding cover is configured to slide over the window opening to shade the pyranometer 820.

The first cylindrical ring may have a radius and a radial thickness parallel to a central axis of the first cylindrical ring;

wherein the width, W, of the shadowband is less than $$\sqrt{\left(4R\sin\left(\frac{\theta}{2}\right) - 2tR\,\sin\left(\frac{\theta}{2}\right) + t^2\right)}$$

where R is the radius of the first cylindrical ring, t is the radial thickness and θ is the angle from the center of the ring to the ends of an arc segment of an outer radial surface of the first cylindrical ring.

The rotating shadowband may further include a second cylindrical ring 1215 concentric with and surrounding the first cylindrical ring 1214, the first and second cylindrical rings each having a thickness, a radially inner surface and a radially outer surface, wherein there is a gap between the radially inner surface of the second cylindrical ring and the radially outer surface of the first cylindrical ring, a plurality of bearings 1258 mounted in the radially inner surface of the second cylindrical ring, wherein the plurality of bearings extend into the gap, and a channel in the radially inner surface of the second cylindrical ring parallel to its thickness. The motor shaft may be configured with a rubber end 1256, and be located in the channel so that the rubber end extends into the gap. A rubber bushing 1213 (see FIG. 12B) may be placed around the radially outer surface of the first cylindrical ring. The first cylindrical ring is configured to be frictionally rotated 360 degrees by the engagement of the rubber end with the rubber bushing when the motor shaft is turned by the motor.

Alternatively, the first embodiment may include a frameless brushless DC motor 1252 having a rotor and a stator; and where the stator is connected to the top surface of the support and the rotor is connected to the first cylindrical ring concentric with the axis of the first cylindrical ring, the motor energizing the stator to rotate the rotor, which rotates the first cylindrical ring as shown in FIG. 12C.

In another alternative illustrated in FIG. 13A-13C, the first embodiment may include that the first cylindrical ring 1314 has a thickness, a central axis parallel to the thickness, a diameter, a radially inner surface and a radially outer surface and a first and second channel extending perpendicularly to the central axis from the radially outer surface to the radially inner surface, wherein the first and second channels are linearly aligned with the diameter of the first cylindrical ring, wherein each bracket 1319 includes a hole perpendicular to the thickness of the band and in line with the channel, wherein the width, W, of the shadowband is less than the thickness of the first cylindrical ring. The motor shaft 1354 may extend through the channel and into the hole of a first bracket 1319, wherein the motor shaft is secured to the first bracket. A pivot shaft 1321 may extend through the second channel and the second bracket, wherein the pivot shaft is secured to the second bracket, and the motor is configured to rotate the shadowband by 180 degrees within the first cylindrical ring by turning the motor shaft, so that the apex of the shadowband moves from a first, docked position, where the apex is in the plane of the first cylindrical ring and a second position, to a second position, where the apex is perpendicular to the plane of the first cylindrical ring and to a third position, where the apex is perpendicular to the plane of the first cylindrical ring and opposite to the first position as shown in FIGS. 13A, 13B.

The first embodiment may include a pyranometer (820, 1420) as shown in FIGS. 14A, 14B, the pyranometer mounted at a central axis 1487 of the support, wherein the first cylindrical ring and shadowband are concentrically located with the central axis of the support and surround the pyranometer, and a semicylindrical glass dome 1480 on the top surface and concentrically located with the central axis of the support, surrounding the first cylindrical ring and the shadowband.

The pyranometer may be configured to receive power from the controller, take measurements of solar radiation and communicate the measurements to the controller. The controller may adjust the rotation of the shadowband based on the measurements of solar radiation. The rotating shadowband may further include a display, wherein the controller is further configured to correct the measurements of diffuse solar radiation based on an angle of rotation of the shadowband, and display the corrected measurements.

The measurements may be corrected based on:

$$E_{DF} = E^*_{DF}(1-(E_b/E_{DF}))^{-1}$$

where $E_{DF}$ is the corrected amount of diffuse radiation, $E^*_{DF}$ is the diffuse solar radiation measured when the pyranometer is blocked by the shadowband, and $E_b/E_{DF}$ is the ratio of the blocked volume over the unblocked volume of diffuse radiation.

In the alternative where the rotating shadowband has a window, the first cylindrical ring has radius and a radial thickness parallel to a central axis of the first cylindrical ring, and the width, W, of the shadowband is less than $$\sqrt{\left(4R\sin\left(\frac{\theta}{2}\right) - 2tR\,\sin\left(\frac{\theta}{2}\right) + t^2\right)}$$

where R is the radius of the first cylindrical ring, t is the radial thickness and θ is the angle from the center of the ring to the ends of an arc segment of an outer radial surface of the first cylindrical ring.

A second embodiment is illustrated with respect to claims 8-20 and describes a system for rotating a shadowband 810, comprising rotating, with a motor 1252 connected to a power source (1262, 1248 or 1260), a shadowband within a first cylindrical ring 814.

The shadowband may include a window opening 910 as shown in FIG. 9A, wherein rotating the shadowband alternately shades and exposes a pyranometer to direct sunlight.

Figure 16:
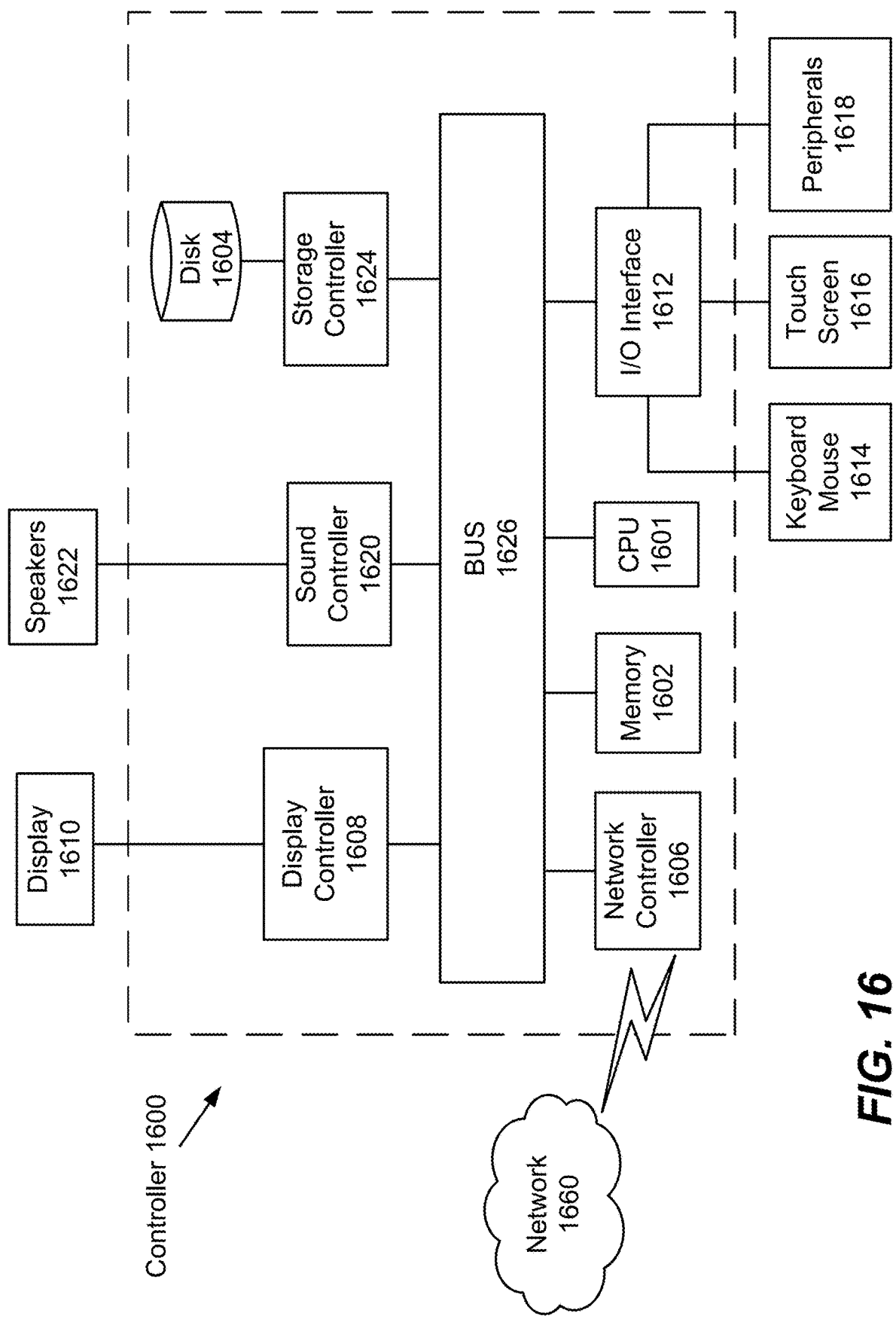
FIG. 16 is an illustration of a non-limiting example of details of computing hardware used in the computing system, according to certain embodiments.

Next, further details of the hardware description of the controller of FIG. 15 according to exemplary embodiments are described with reference to FIG. 16. In FIG. 16, a controller 1600 is described is representative of the control system 1570 of FIG. 15 in which the controller is a computing device which includes a CPU 1601 which performs the processes described above/below. The process data and instructions may be stored in memory 1602. These processes and instructions may also be stored on a storage medium disk 1604 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 1601 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 1601 may be a Xenon or Core processor from Intel of America or an Opteron processor from AMD of America, or may be other processor types that would be recognized by one of ordinary skill in the art. Alternatively, the CPU 1601 may be implemented on an FPGA, ASIC, PLD or using discrete logic circuits, as one of ordinary skill in the art would recognize. Further, CPU 1601 may be implemented as multiple processors cooperatively working in parallel to perform the instructions of the inventive processes described above.

The computing device in FIG. 16 also includes a network controller 1606, such as an Intel Ethernet PRO network interface card from Intel Corporation of America, for interfacing with network 1660. As can be appreciated, the network 1660 can be a public network, such as the Internet, or a private network such as an LAN or WAN network, or any combination thereof and can also include PSTN or ISDN sub-networks. The network 1660 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1608, such as a NVIDIA GeForce GTX or Quadro graphics adaptor from NVIDIA Corporation of America for interfacing with display 1610, such as a Hewlett Packard HPL2445w LCD monitor. A general purpose I/O interface 1612 interfaces with a keyboard and/or mouse 1614 as well as a touch screen panel 1616 on or separate from display 1610. General purpose I/O interface also connects to a variety of peripherals 1618 including printers and scanners, such as an OfficeJet or DeskJet from Hewlett Packard.

A sound controller 1620 is also provided in the computing device such as Sound Blaster X-Fi Titanium from Creative, to interface with speakers/microphone 1622 thereby providing sounds and/or music.

The general purpose storage controller 1624 connects the storage medium disk 1604 with communication bus 1626, which may be an ISA, EISA, VESA, PCI, or similar, for interconnecting all of the components of the computing device. A description of the general features and functionality of the display 1610, keyboard and/or mouse 1614, as well as the display controller 1608, storage controller 1624, network controller 1606, sound controller 1620, and general purpose I/O interface 1612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 17.

Figure 17:
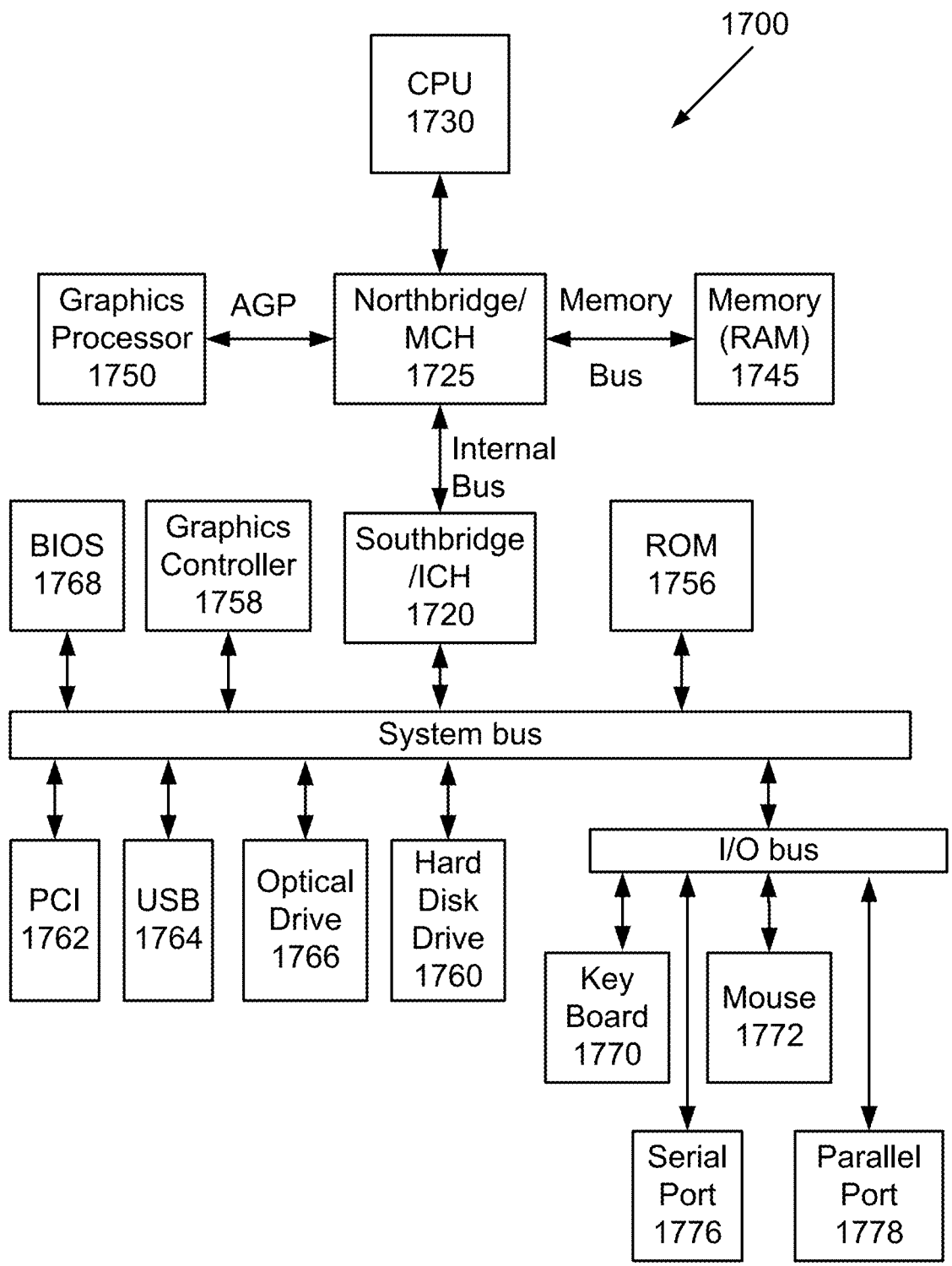
FIG. 17 is an exemplary schematic diagram of a data processing system used within the computing system, according to certain embodiments.

FIG. 17 shows a schematic diagram of a data processing system, according to certain embodiments, for performing the functions of the exemplary embodiments. The data processing system is an example of a computer in which code or instructions implementing the processes of the illustrative embodiments may be located.

In FIG. 17, data processing system 1700 employs a hub architecture including a north bridge and memory controller hub (NB/MCH) 1725 and a south bridge and input/output (I/O) controller hub (SB/ICH) 1720. The central processing unit (CPU) 1730 is connected to NB/MCH 1725. The NB/MCH 1725 also connects to the memory 1745 via a memory bus, and connects to the graphics processor 1750 via an accelerated graphics port (AGP). The NB/MCH 1725 also connects to the SB/ICH 1720 via an internal bus (e.g., a unified media interface or a direct media interface). The CPU Processing unit 1730 may contain one or more processors and even may be implemented using one or more heterogeneous processor systems.

Figure 18:
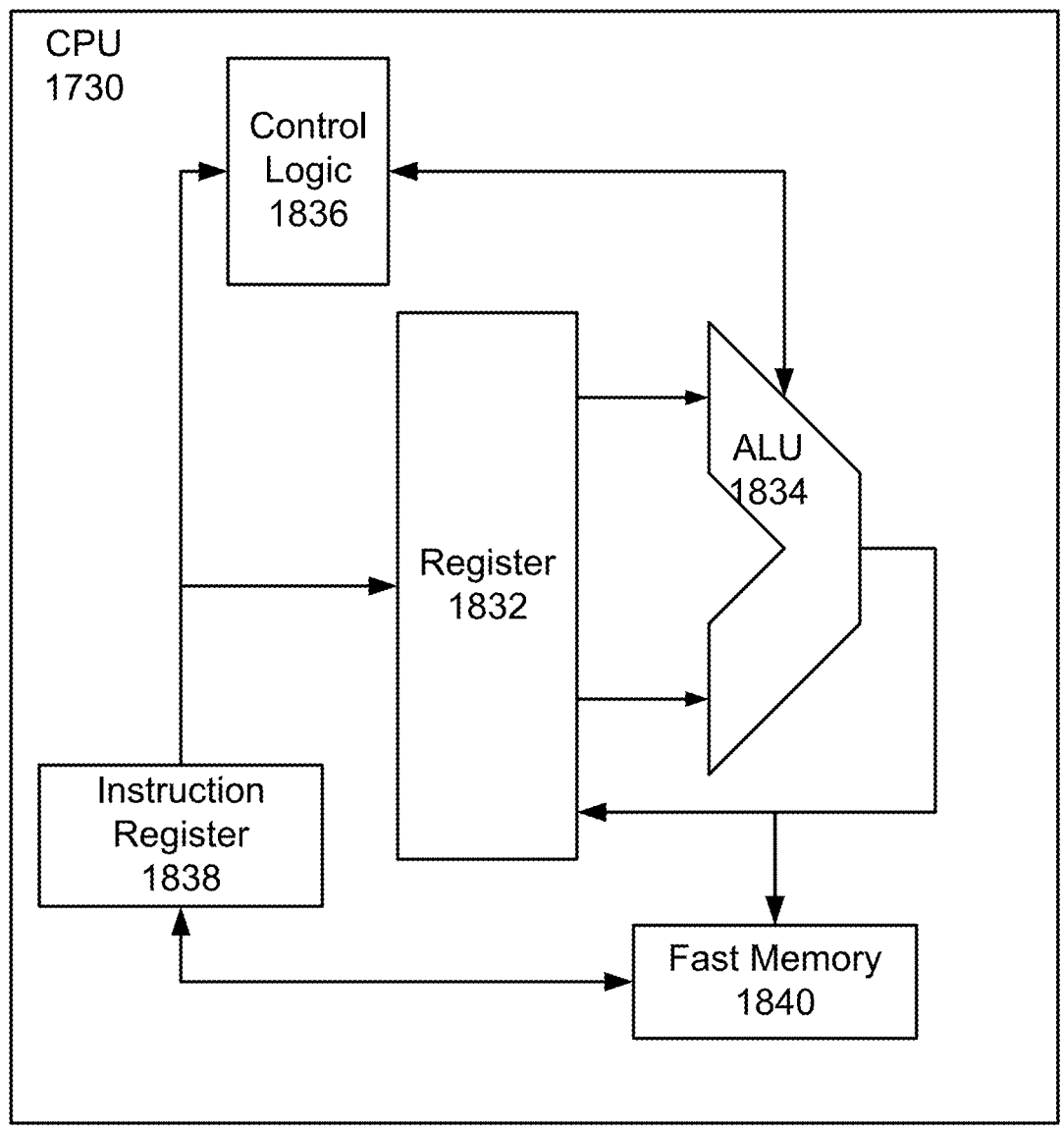
FIG. 18 is an exemplary schematic diagram of a processor used with the computing system, according to certain embodiments.

For example, FIG. 18 shows one implementation of CPU 1730. In one implementation, the instruction register 1838 retrieves instructions from the fast memory 1840. At least part of these instructions are fetched from the instruction register 1838 by the control logic 1836 and interpreted according to the instruction set architecture of the CPU 1730. Part of the instructions can also be directed to the register 1832. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1834 that loads values from the register 1832 and performs logical and mathematical operations on the loaded values according to the instructions. The results from these operations can be feedback into the register and/or stored in the fast memory 1840. According to certain implementations, the instruction set architecture of the CPU 1730 can use a reduced instruction set architecture, a complex instruction set architecture, a vector processor architecture, a very large instruction word architecture. Furthermore, the CPU 1730 can be based on the Von Neuman model or the Harvard model. The CPU 1730 can be a digital signal processor, an FPGA, an ASIC, a PLA, a PLD, or a CPLD. Further, the CPU 1730 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 17, the data processing system 1700 can include that the SB/ICH 1720 is coupled through a system bus to an I/O Bus, a read only memory (ROM) 1756, universal serial bus (USB) port 1764, a flash binary input/output system (BIOS) 17617, and a graphics controller 1758. PCI/PCIe devices can also be coupled to SB/ICH 1788 through a PCI bus 1762.

The PCI devices may include, for example, Ethernet adapters, add-in cards, and PC cards for notebook computers. The Hard disk drive 1760 and CD-ROM 1766 can use, for example, an integrated drive electronics (IDE) or serial advanced technology attachment (SATA) interface. In one implementation the I/O bus can include a super I/O (SIO) device.

Further, the hard disk drive (HDD) 1760 and optical drive 1766 can also be coupled to the SB/ICH 1720 through a system bus. In one implementation, a keyboard 1770, a mouse 1772, a parallel port 1778, and a serial port 1776 can be connected to the system bus through the I/O bus. Other peripherals and devices that can be connected to the SB/ICH 1720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 19:
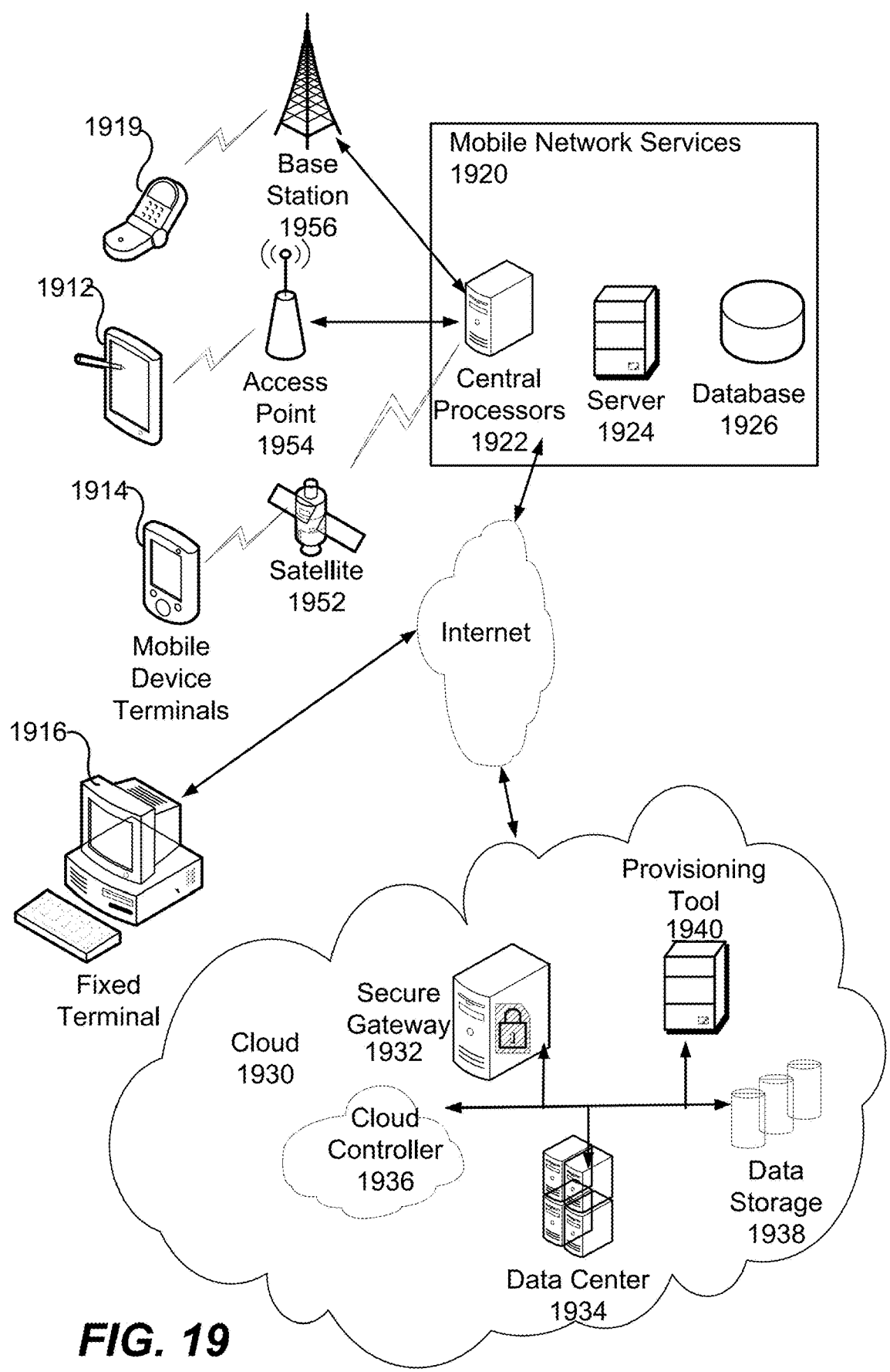
FIG. 19 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 19, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A rotating shadowband for shading a pyranometer, comprising:
a support structure including a base, a top surface, a hollow interior and side walls;
a first cylindrical ring connected to the top surface;
a semicircular shadowband held by the cylindrical ring;
a motor configured for rotating the semicircular shadowband;
a rechargeable battery; and
a controller having circuitry configured to power the first motor to rotate the semicircular shadowband.

2. The rotating shadowband of claim 1, further comprising
at least one solar panel mounted to the sidewalls and electrically connected to the controller;
wherein the controller is configured to receive current generated by the solar panel;
a grid power source electrically connected to the controller;
wherein the controller is further configured to determine a state of charge of the battery;
wherein the controller is configured to use current generated by the at least one solar panel to operate the motor and recharge the battery;
wherein the controller is further configured to use current from the power source to operate the motor and recharge the battery; and
wherein the controller includes switching circuitry configured to switch between the grid power source, the at least one solar panel and the battery to power the motor.

3. The rotating shadowband of claim 1, further comprising:
wherein the shadowband has a length, a width, a center, an apex at the center, a first end and a second end; and
wherein the first and the second ends are attached to the cylindrical ring by a first and a second bracket respectively.

4. The rotating shadowband of claim 3, further comprising:
wherein the first cylindrical ring has radius and a radial thickness parallel to a central axis of the first cylindrical ring;
wherein the width, W, of the shadowband is less than $$\sqrt{\left(4R\sin\left(\frac{\theta}{2}\right) - 2tR\sin\left(\frac{\theta}{2}\right) + t^2\right)}$$

where R is the radius of the first cylindrical ring, t is the radial thickness and θ is the angle from the center of the ring to the ends of an arc segment of an outer radial surface of the first cylindrical ring.

5. The rotating shadowband of claim 4, further comprising:
wherein the shadowband includes a window opening, wherein the window opening substantially extends from a center of the band to a first end.

6. The rotating shadowband of claim 5, further comprising:
a sliding cover attached to the shadowband;
wherein the sliding cover is configured to slide over the window opening to shade the pyranometer.

7. The rotating shadowband of claim 5, further comprising:
a second cylindrical ring concentric with and surrounding the first cylindrical ring, the first and second cylindrical rings each having a thickness, a radially inner surface and a radially outer surface;
a gap between the radially inner surface of the second cylindrical ring and the radially outer surface of the first cylindrical ring;
a plurality of bearings mounted in the radially inner surface of the second cylindrical ring, wherein the plurality of bearings extend into the gap;
a channel in the radially inner surface of the second cylindrical ring parallel to its thickness;
wherein the motor has a motor shaft configured with a rubber end;
wherein the motor shaft is located in the channel and the rubber end extends into the gap;
a rubber bushing around the radially outer surface of the first cylindrical ring; and
wherein the first cylindrical ring is configured to be frictionally rotated 360 degrees by the engagement of the rubber end with the rubber bushing when the motor shaft is turned by the motor.

8. The rotating shadowband of claim 5, further comprising:
wherein the motor is a frameless brushless DC motor having a rotor and a stator; and where the stator is connected to the top surface of the support and the rotor is connected to the first cylindrical ring concentric with the axis of the first cylindrical ring.

9. The rotating shadowband of claim 3,
wherein the first cylindrical ring has a thickness, a central axis parallel to the thickness, a diameter, a radially inner surface and a radially outer surface and a first and second channel extending perpendicularly to the central axis from the radially outer surface to the radially inner surface, wherein the first and second channels are linearly aligned with the diameter of the first cylindrical ring;
wherein each bracket includes a hole perpendicular to the thickness of the band and in line with the channel;
wherein the width, W, of the shadowband is less than the thickness of the first cylindrical ring;
wherein the motor shaft extends through the channel and the hole of a first bracket;
wherein the motor shaft is secured to the first bracket;
wherein a pivot shaft extends through the second channel and the second bracket;
wherein the pivot shaft is secured to the second bracket; and
wherein the motor is configured to rotate the shadowband by at least 180 degrees within the first cylindrical ring by turning the motor shaft, so that the apex of the shadowband moves from a first, docked position, where the apex is in the plane of the first cylindrical ring and a second position, to a second position, where the apex is perpendicular to the plane of the first cylindrical ring and to a third position, where the apex is perpendicular to the plane of the first cylindrical ring and opposite to the first position.

10. The rotating shadowband of claim 7, further comprising:
a pyranometer mounted at a central axis of the support;
wherein the first cylindrical ring and shadowband are concentrically located with the central axis of the support and surround the pyranometer; and
a semicylindrical glass dome located on the top surface and concentrically located with the central axis of the support and surrounding the first cylindrical ring and the shadowband.

11. The rotating shadowband of claim 10,
wherein the pyranometer is configured to receive power from the controller;
wherein the pyranometer is configured to take measurements of solar radiation and communicate the measurements to the controller; and
wherein the controller is configured to receive measurements of solar radiation from the pyranometer and adjust the rotation of the shadowband based on the measurements of solar radiation.

12. The rotating shadowband of claim 7, further comprising:
a pyranometer mounted at a central axis of the support;
a display;
wherein the pyranometer is configured to take measurements of solar radiation and communicate the measurements to the controller;
wherein the controller is further configured to:
receive the measurements of solar radiation;
calculate the amount of diffuse radiation, $E_{DF}$, based on:

$$E_{DF}=E^*_{DF}(1-(E_b/E_{DF}))^{-1}$$

where $E^*_{DF}$ is the diffuse solar radiation measured when the pyranometer is shaded by the shadowband, and $E_b/E_{DF}$ is the ratio of the shaded volume over the unshaded volume of diffuse radiation; and
display the corrected measurements.

13. The rotating shadowband of claim 8, further comprising:
a pyranometer mounted at a central axis of the support;
wherein the first cylindrical ring and shadowband are concentrically located with the central axis of the support and surround the pyranometer; and
a semicylindrical glass dome located on the top surface and concentrically located with the central axis of the support and surrounding the first cylindrical ring and the shadowband.

14. The rotating shadowband of claim 13,
wherein the pyranometer is configured to receive power from the controller;
wherein the pyranometer is configured to take measurements of solar radiation and communicate the measurements to the controller; and
wherein the controller is configured to receive measurements of solar radiation from the pyranometer and adjust the rotation of the shadowband based on the measurements of solar radiation.

15. The rotating shadowband of claim 8, further comprising:
a pyranometer mounted at a central axis of the support;
a display;
wherein the pyranometer is configured to take measurements of solar radiation and communicate the measurements to the controller;
wherein the controller is further configured to:
receive the measurements of solar radiation;
calculate the amount of diffuse radiation, $E_{DF}$, based on:

$$E_{DF}=E^*_{DF}(1-(E_b/E_{DF}))^{-1}$$

where $E^*_{DF}$ is the diffuse solar radiation measured when the pyranometer is shaded by the shadowband, and $E_b/E_{DF}$ is the ratio of the shaded volume over the unshaded volume of diffuse radiation; and
display the corrected measurements.

16. The rotating shadowband of claim 9, further comprising:
a pyranometer mounted at a central axis of the support;
wherein the first cylindrical ring and shadowband are concentrically located with the central axis of the support and surround the pyranometer; and
a semicylindrical glass dome located on the top surface and concentrically located with the central axis of the support and surrounding the first cylindrical ring and the shadowband.

17. The rotating shadowband of claim 16,
wherein the pyranometer is configured to receive power from the controller;
wherein the pyranometer is configured to take measurements of solar radiation and communicate the measurements to the controller; and
wherein the controller is configured to receive measurements of solar radiation from the pyranometer and adjust the rotation of the shadowband based on the measurements of solar radiation.

18. The rotating shadowband of claim 9, further comprising:
a pyranometer mounted at a central axis of the support;
a display;

wherein the pyranometer is configured to take measurements of solar radiation and communicate the measurements to the controller;
wherein the controller is further configured to:
receive the measurements of solar radiation;
calculate the amount of diffuse radiation, $E_{DF}$, based on:

$$E_{DF} = E^*_{DF}(1-(E_b/E_{DF}))^{-1}$$

where $E^*_{DF}$ is the diffuse solar radiation measured when the pyranometer is shaded by the shadowband, and $E_b/E_{DF}$ is the ratio of the shaded volume over the unshaded volume of diffuse radiation; and
display the corrected measurements.

19. A system for rotating a shadowband, comprising:
rotating, with a motor connected to a power source, a shadowband within a first cylindrical ring.

20. The system for rotating a shadowband of claim 19, comprising
wherein the shadowband includes a window opening; and
wherein rotating the shadowband alternately shades and exposes a pyranometer to direct sunlight.

* * * * *